United States Patent [19]
Oguchi et al.

[11] Patent Number: 5,612,526
[45] Date of Patent: Mar. 18, 1997

[54] MAGNETIC CARD READER

[75] Inventors: Shigeki Oguchi; Jun-ichi Yazaki; Shigeyuki Nagata, all of Nagano, Japan

[73] Assignee: Kabushiki Kaisha Sankyo Seiki Seisakusho, Nagano, Japan

[21] Appl. No.: 540,245

[22] Filed: Oct. 6, 1995

[30] Foreign Application Priority Data

Oct. 6, 1994 [JP] Japan .................................. 6-243153

[51] Int. Cl.⁶ ............................................ G06F 17/00
[52] U.S. Cl. ...................................... 235/375; 235/493
[58] Field of Search ................................ 235/375, 493

[56] References Cited

U.S. PATENT DOCUMENTS 5,417,905  5/1995  Lemaire ................................. 235/375

Primary Examiner—Harold Pitts
Attorney, Agent, or Firm—Sughrue, Mion, Zinn, Macpeak & Seas

[57] ABSTRACT

A magnetic card reader receives a magnetic card with a magnetic stripe through an entrance port, transports the magnetic card along a transport path by transporting unit, carries out a process of reading and writing information out of and to the magnetic stripe of the magnetic card by magnetic read/write unit located facing the transport path, cuts the magnetic card into at least two cards in the direction orthogonal to the card transporting direction by a cutter unit located in the transport path, and guides those cut cards to a card discharge path or a collector path, both being continuous to the transport path, by first path-selector unit located at the intersection of the card discharge path and the collector path. In the magnetic card reader, a distance between the magnetic read/write unit and the cutter unit is the sum of the length of the cut card which is the shortest of all of the cut cards when viewed in the transport direction and a braking distance of the transporting unit in a time from a constant transporting state of the transporting unit to a stop state of the transporting unit by a stop signal.

17 Claims, 11 Drawing Sheets

MAGNETIC CARD READER

BACKGROUND OF THE INVENTION

The present invention relates to a magnetic card reader for processing a thin and flexible magnetic card, such as an ATB (automatic ticketing/boarding) pass of an airline ticket.

In the ATB pass as an typical example of the thin and flexible magnetic card, a magnetic stripe for recording information is formed along one side thereof. Information stored in the magnetic stripe is updated if necessary. The ATB pass consists of a pass and a coupon, which are separated by a perforation. During the processing of the ATB pass, it is parted into the pass and the coupon along the perforation. For processing the ATB pass, a magnetic card reader is used which is provided with a magnetic head, a cutter unit and a stamper unit.

The magnetic card reader, since it must handle a long magnetic card, linearly transports a magnetic card by a card transporting means and reads information from the magnetic card by a magnetic head. To alter the information recorded in the magnetic card or to retry to read information from the magnetic card, the card transporting means is turned in the reverse direction to return the magnetic card to the entrance slit. To prevent such a situation that the returning magnetic card passes the magnetic head and part of the magnetic card is protruded from the entrance slit, a distance from the entrance slit to the magnetic head is longer than the entire length of the magnetic card. Further, the cutter unit and the stamper unit are disposed for the respective functions along the card transport path in the card insertion direction. Therefore, a long card transport path is required, and much time is taken for processing the magnetic card.

A curved transport path is used for transporting a magnetic card in the conventional magnetic card reader. The transport path is constructed with a drive belt and a follower belt, and forwardly and reversely transports a magnetic card in a manner that the card is nipped between the drive and follower belts. However, a transport speed of the magnetic card when it is transported in the forward direction is greatly different from that of the magnetic card when it is transported in the reverse direction. As a result, the operation of reading and writing information out of and to the magnetic card are inexact.

The magnetic card is parted into a pass and a coupon in the magnetic card reader, and the pass is held in the stacking unit, located at the exit slit of the card reader, and transferred to a passenger. The coupons are collected in the card reader. For parties of passengers or families, it is convenient to transfer the passes enbloc to each party or each family. In this respect, it is desirable for the magnetic card reader to have such a function as to transfer coupons enbloc.

SUMMARY OF THE INVENTION

Accordingly, an object of the present invention is to provide a magnetic card reader which has a reduced transport path, is compact in size and operation, and capable of quickly processing a magnetic card.

Another object of the present invention is to provide a magnetic card reader with a forward/reverse transport mechanism which is capable of minimizing the difference between a transport speed of a magnetic card being transported in the forward direction and that of the magnetic card being transported in the reverse direction.

Yet another object of the present invention is to provide a magnetic card reader with a stacking unit which is capable of reliably holding therein a plural number of passes in a well arranged state.

According to the present invention, there is provided a magnetic card reader which receives a magnetic card with a magnetic stripe through an entrance port, transports the magnetic card along a transport path by transporting means, carries out a process of reading and writing information out of and to the magnetic stripe of the magnetic card by magnetic read/write means located facing the transport path, cuts the magnetic card into at least two cards in the direction orthogonal to the card transporting direction by a cutter unit located in the transport path, and guides those cut cards to a card discharge path or a collector path, both being continuous to the transport path, by first path-selector means located at the intersection of the card discharge path and the collector path, and is improved in that a distance between the magnetic read/write means and the cutter unit is the sum of the length of the cut card which is the shortest of all of the cut cards when viewed in the transport direction and a braking distance of the transporting unit in a time from a constant transporting state of the transporting unit to a stop state of the transporting unit by a stop signal.

DETAILED DESCRIPTION OF THE PREFERRED EMBODIMENTS

A first embodiment of a magnetic-card reader according to the present invention will be described with reference to FIGS. 1 through 7.

Figure 6:
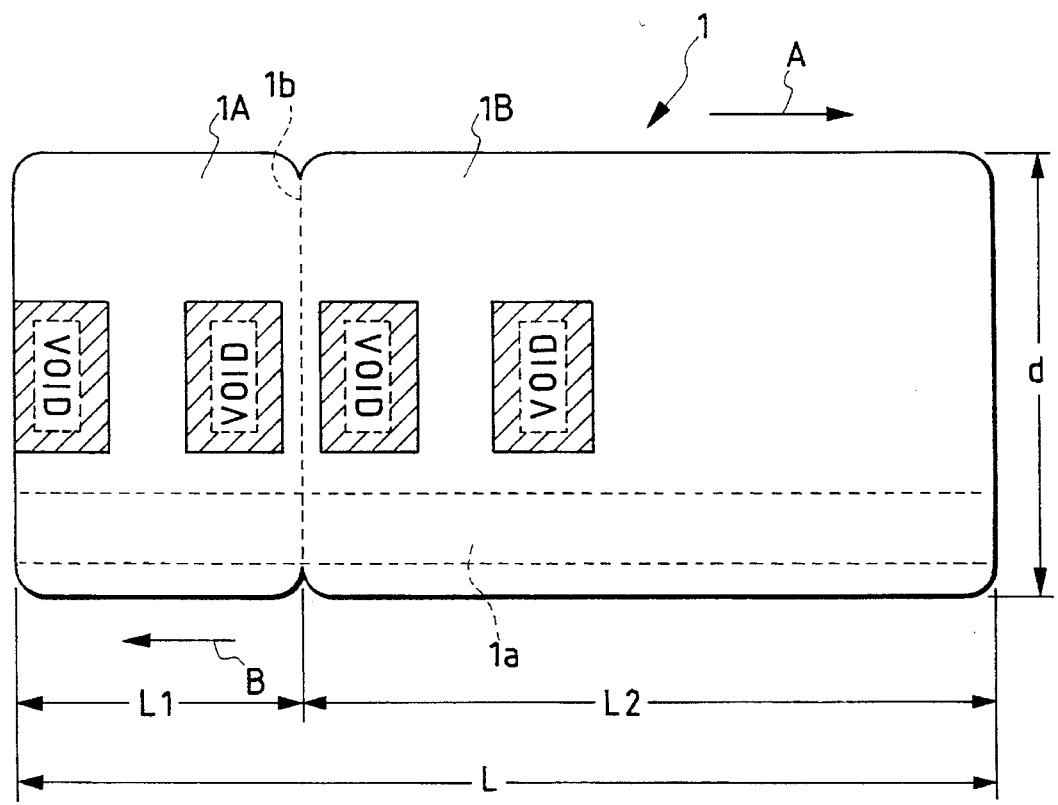
FIG. 6 is a plan view showing an ATB pass as an example of a magnetic card.

Referring to FIG. 6, there is shown an ATB pass 1 as an example of a magnetic card. The ATB pass 1 is a thin, elongated rectangular sheet long in the transport direction of the card. Print data (not shown), such as an origin and a destination, are printed on the obverse side of the ATB pass 1, and further an inspection mark is stamped thereon by a stamper unit to be described later. A magnetic stripe 1a as 1a magnetic print layer is longitudinally formed on the reverse side of the ATB pass 1. Data including the print data that is printed on the obverse side of the ATB pass 1 is magnetically recorded in the magnetic stripe 1a. The ATB pass 1 consists of a pass 1A and a coupon 1B, which are marked off by a perforation 1b. The pass 1A is short in its longitudinal direction and used as the shortest parted magnetic card transferred to a passenger. The coupon 1B is long and used as the longest parted magnetic card to be collected by the magnetic card reader. The ATB pass 1 is put into the magnetic-card processor shown in FIG. 1 (hereinafter referred to as a magnetic card reader), through an entrance slit 3 thereof to be processed. In this embodiment, an insertion of the ATB pass 1 into the magnetic card reader through the entrance slit 3 in a state that the coupon 1B thereof is first inserted thereinto (arrow A in FIG. 6) while the reverse side of the ATB pass 1 is faced down, is referred to as a forward insertion of the ATB pass 1. Another insertion of the ATB pass 1 in a state that the pass 1A is first inserted thereinto (arrow B) is referred to as a reverse insertion.

The entire length L1 of the pass 1A in the transport direction is shorter than the entire length L2 of the coupon 1B. The entire length L1 of the pass 1A is referred to as the shortest entire length of the ATB pass 1 after it is partitioned. The entire length L2 of the coupon 1B is referred to as the longest entire length of the ATB pass 1 after it is partitioned.

Figure 1:
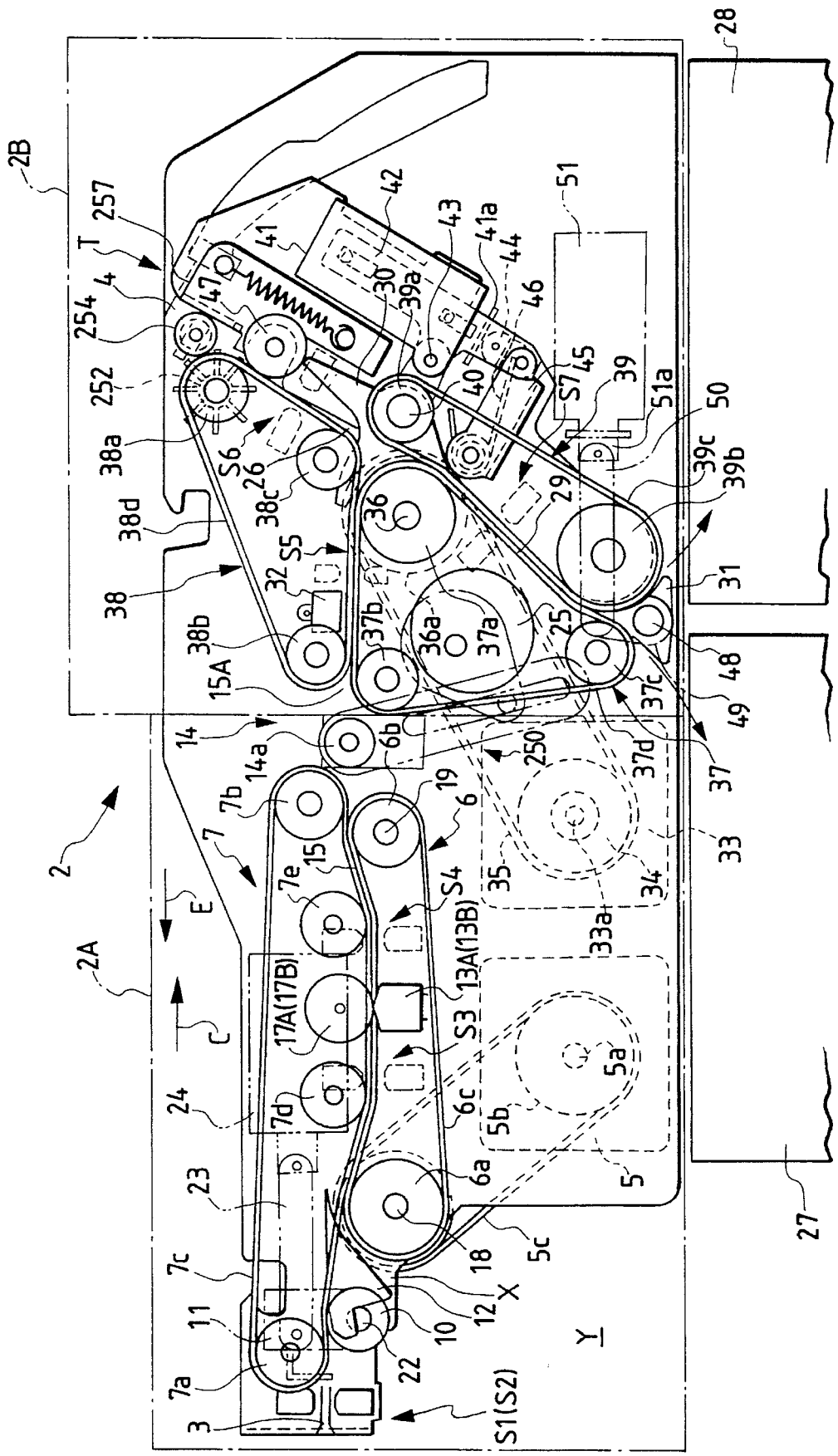
FIG. 1 is a longitudinal sectional view showing a first embodiment of a magnetic card reader according to the present invention.
Figure 2:
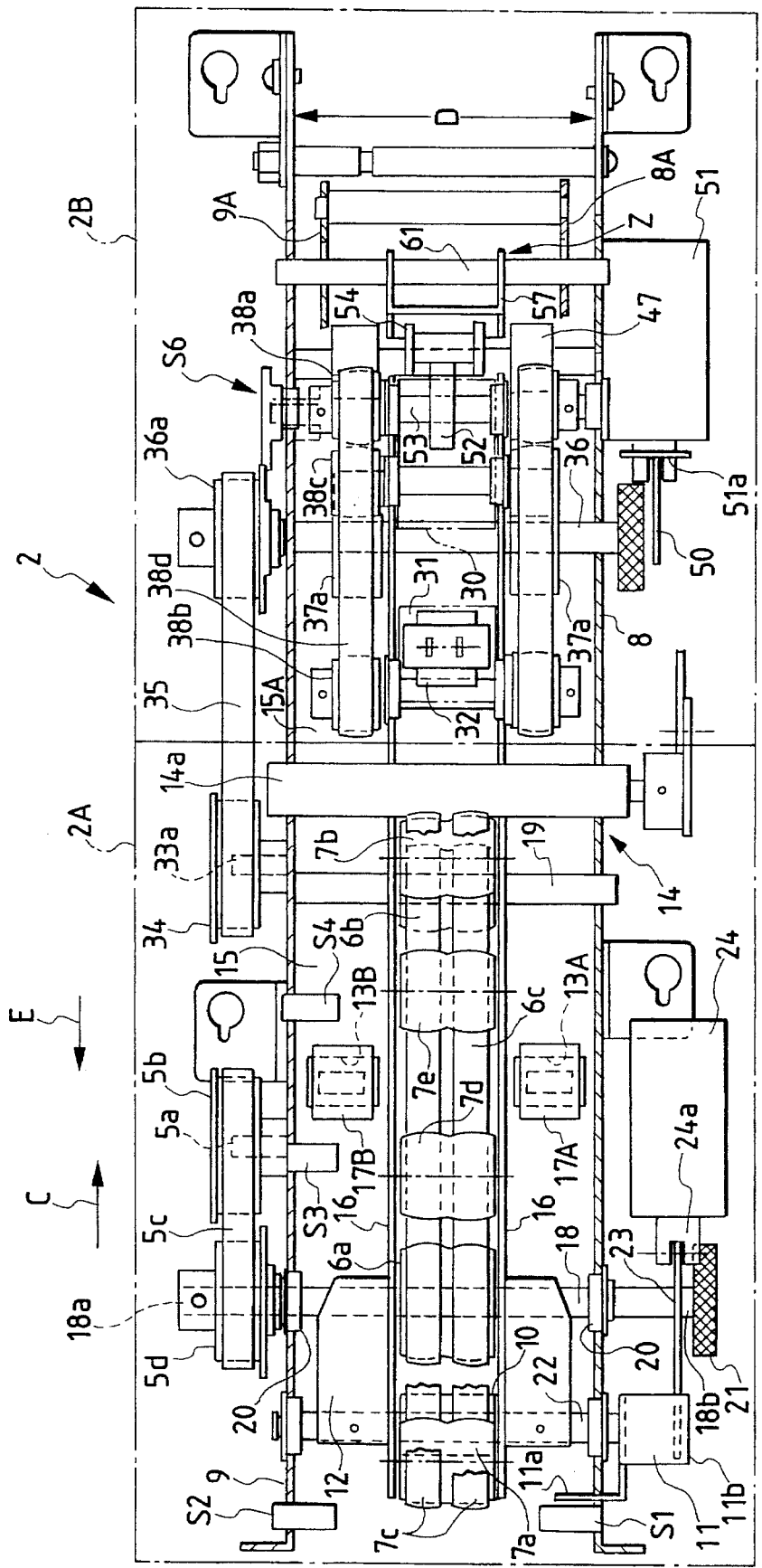
FIG. 2 is a plan view, partly broken, showing the magnetic card reader of FIG. 1.

The magnetic card reader designated by reference numeral 2, shown in FIGS. 1 and 2, is installed at the boarding gate of an airport. The magnetic card reader 2 is generally divided into a card reader section 2A including the entrance slit 3 for receiving the ATB pass 1, and a card discharge section 2B including an exit slit 4 from which the ATB pass 1 is discharged.

In the card reader section 2A, a first drive belt unit 6 and a first follower belt unit 7 form a first transport means for transporting the ATB pass 1, which includes a plural number of first transport rollers. The first drive belt unit 6 is driven by a drive motor 5 as a first drive source, located in the lower portion of the card reader section 2A and rotatable forwardly and reversely. The first drive belt unit 6, the first follower belt unit 7, and frames 8 and 9 cooperate to form a first transport path 15, which communicates with the entrance slit 3. A roller 10 pulls the ATB pass 1 coming in through the entrance slit 3 into the magnetic card reader 2. A first flap 12 cooperates with a shutter 11 to regulate the advancement of the ATB pass 1. Further, it switches the advancing direction of the ATB pass 1 to another when the ATB pass 1 is reversely transported. In this sense, it serves as a switch member. A pair of magnetic heads 13A and 13B are provided for reading magnetic information of the ATB pass 1. A cutter unit 14 cuts the ATB pass 1 along the perforation 1b into the pass 1A and the coupon 1B. The shutter 11, the first flap 12, the paired magnetic heads 13A and 13B, and the cutter unit 14 are disposed in this order in the card insertion direction (indicated by an arrow C), from the entrance slit 3.

The first follower belt unit 7, as shown in FIG. 2, includes a couple of endless belts 7c, and rollers 7d and 7e. The endless belts 7c are wound around transport rollers 7a and 7b, which are located between and rotatably supported by a pair of base plates 16 extending in the longitudinal direction of the card reader section 2A. The rollers 7d and 7e, rotatably supported by the paired base plates 16, push down the endless belts 7c. A pair of pad rollers 17A and 17B, which apply a predetermined pad pressure to the paired magnetic heads 13A and 13B, are rotatably supported by the paired base plates 16, which support both ends of the rollers 7d and 7e. The first drive belt unit 6, located on the lower side of the first follower belt unit 7, is supported by a drive shaft 18 and a support shaft 19, which are respectively supported by the frames 8 and 9. In the first drive belt unit 6, a belt 6c, which is in contact with the endless belts 7c, is stretched between a drive roller 6a and a follower roller 6b, which are contained in the transport roller group. The first drive belt unit 6 is located in the middle of the first transport path 15 (FIG. 2).

The follower roller 6b is rotatably supported by the support shaft 19. The drive roller 6a is fastened to the drive shaft 18, which is rotatably supported by the frames 8 and 9 with the aid of bearings 20. A belt pulley 5d is fixed securely to one end 18a of the drive shaft 18. A drive pulley 5b is mounted on the output shaft 5a of the drive motor 5. A belt 5c is stretched between the belt pulley 5d and the drive pulley 5b. A knob 21 is fastened to the other end 18b of the drive shaft 18. The knob 21 is used for manually turning the drive shaft 18.

The width D of the first transport path 15 is defined by the frames 8 and 9, as shown in FIG. 2. The width D is substantially equal to the width d of the ATB pass 1 shown in FIG. 6. The width D restricts the position of the ATB pass 1 in the width direction.

The paired magnetic heads 13A and 13B each have the functions of reading and writing information. These are disposed on both sides of the belt 6c in the first transport path 15, and being aligned with the location of the magnetic stripe 1a of the ATB pass 1. The magnetic head 13A is provided for the ATB pass 1 when it is inserted in the forward direction, while the magnetic head 13B is provided for the ATB pass 1 when it is inserted in the reverse direction. The magnetic heads 13A and 13B operate to read information from the magnetic stripe 1a on the ATB pass 1 when it is transported in the direction of the arrow C, and write information therein when it is transported toward the entrance slit 3.

The pull-in roller 10 is rotatably supported by a support shaft 22, which is also rotatably supported by the frames 8 and 9, while being in contact with the endless belts 7c. The support shaft 22 extending to both sides of the drive and follower belt units 6 and 7, fixedly supports the first flap 12 which is positioned in the first transport path 15.

The shutter 11, formed by bending a plate, is fixed firmly to the support shaft 22 in a state that the tip 11a thereof is placed in the first transport path 15. The shutter 11 can be swung about the support shaft 22. The upper part 11b of the side of the shutter 11 is pin-coupled with a lever 23, which is coupled with a movable piece 24a of an electromagnetic solenoid 24. When the electromagnetic solenoid 24 is energized, it is turned together with the first flap 12.

Figure 3:
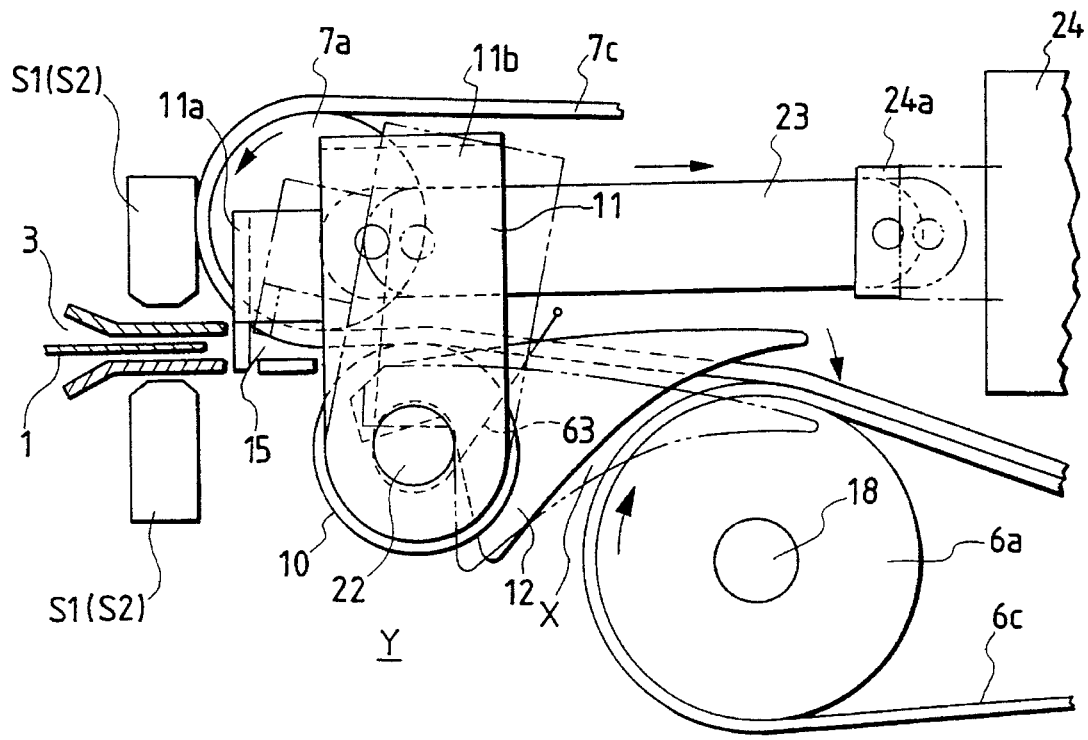
FIG. 3 is an enlarged side view showing a key portion of the magnetic card reader of the first embodiment, the illustration being useful in explaining a mechanism including a first flap and its operation.

Normally, the shutter 11 and the first flap 12 are urged by a coil spring 63 to the position where they enter into the first transport path 15, as indicated by solid lines (FIG. 3). The coil spring 63 is wound around the support shaft 22. One end of the coil spring 63 is brought into contact with a pin for coupling the shutter 11 with the lever 23, while the other end thereof is fixed to the frame (not shown). When the electromagnetic solenoid 24 is operated to pull the movable piece 24a toward the solenoid per se, the shutter 11 and the first flap 12 are swung to the locations indicated by two-dot chain lines, so that those retract from the first transport path 15. When the shutter 11 is placed in the first transport path 15 as indicated by the solid line, it interrupts the communication of the entrance slit 3 with the first transport path 15. When it retracts from the first transport path 15, the entrance slit 3 communicates with the first transport path 15. When the first flap 12 is placed in the first transport path 15, the first flap 12, in cooperation with the shutter 11, interrupts the communication of the entrance slit 3 with the first transport path 15, so that a branch path X is formed between the first flap 12 and the belt 6c that is put on the drive roller 6a. The branch path X is opened into a space Y formed below the pull-in roller 10. The ATB pass 1 being transported in the reverse direction is guided and introduced into the space Y through by the branch path X.

Card sensors S1 and S2 for detecting the width of the ATB pass 1 are disposed in the first transport path 15 between the shutter 11 and the entrance slit 3. The card sensor S1 is attached to the frame 8, and the card sensor S2, to the frame 9. When the thus disposed sensors detect that the ATB pass 1 has a predetermined width, the electromagnetic solenoid 24 is driven to pull the shutter 11 and the first flap 12 out of the first transport path 15, while at the same time the drive motor 5 and another drive motor 33 as a second drive source described later are driven to turn.

The drive motors 5 and 33 are stepping motors. When those are driven, those turn clockwise to transport the ATB pass 1 in the direction C. When the paired magnetic heads 13A and 13B incorrectly read information from the ATB pass or write information into the ATB pass, those motors are turned counterclockwise to reversely transport the ATB pass 1 in the direction of an arrow E. To achieve such a control of the motor operation, a plural number of card sensors described later are used in connection with the drive motors.

A card sensor S3 as a magnetic card detecting means is located between the roller 7d and the paired magnetic heads 13A and 13B, and a card sensor S4, between the roller 7e and the paired magnetic heads 13A and 13B (FIGS. 1 and 2). Those sensors are attached to the frame 9. The card sensor 3 detects the trailing edge of the ATB pass 1. A signal produced when it detects the trailing edge is used for setting the timing of the operation of the cutter unit 14. Further, it is used for turning off the electromagnetic solenoid 24 so that the shutter 11 and the first flap 12 are placed in the first transport path 15 (indicated by solid lines in FIG. 3). The card sensor S4 detects a position of the ATB pass 1. A signal produced when it detects a position of the ATB pass 1 is used for setting the timing of writing information into the ATB pass 1 by the paired magnetic heads 13A and 13B.

To be more specific, when the card sensor S3 senses the trailing edge of the ATB pass 1 traveling in the forward direction and the drive motors 5 and 33 are tuned at preset step angles, those drive motors are stopped, while at the same time the cutter unit 14 is started up and a stamper unit described later is also driven simultaneously.

The following distances W1 to W5 are each shorter than the entire length L1 of the pass 1A shown in FIG. 6:

W1= distance between the entrance slit 3 and the center of rotation of the pull-in roller 10, W2=distance between the center of rotation of the pull-in roller 10 and the center of rotation of the drive roller 6a, W3=distance between the center of rotation of the drive roller 6a and the center of rotation of the roller 7d, W4=distance between the center of rotation of the roller 7d and the center of rotation of the roller 7e, and W5=distance between the center of rotation of the roller 7e and the center of rotation of the follower roller 6b.

The pull-in roller 10 is in press contact with the endless belts 7c. The rollers 7d and 7e press the endless belts 7c against the belt 6c between the drive roller 6a and the follower roller 6b. That is, the distance between the adjacent rollers is shorter than the entire length L1 of the pass 1A. Further, the ATB pass 1 is transported while being in press contact with the belt and the belts, when it passes the portions where endless belts 7c are in press contact with the pull-in roller 10, and the portions where the belts 6c and 7c are under the pressure by the follower rollers 7d and 7e.

A distance W10 between the center of each of the paired magnetic heads 13A and 13B and the cutting position of the cutter unit 14 is longer than the entire length L1 of the pass 1A. To be more exact, the distance W10=[entire length L1 of the pass 1A]+[braking distance corresponding to a time lag ranging from the issuance of a stop command by the card sensor S3 till the drive motor 5 is actually stopped].

As shown in FIG. 1, in the cutter unit 14 for partitioning the ATB pass 1, located in the first transport path 15, into the pass 1A and the coupon 1B is coupled with a cutter drive motor (referred to as a cutter motor) 25 by a link mechanism 250, and a rotary blade 14a, rotatably supported by the frames 8 and 9, is reciprocatively moved. When receiving a drive command from the card sensor S3, the cutter unit 14 is driven to cut the ATB pass 1 along the perforation 1b thereof into the pass 1A and the coupon 1B.

In the card discharge section 2B, as shown in FIGS. 1 and 2, a second transport belt unit 37 is driven by the drive motor 33. The second transport belt unit 37 and a second follower belt unit 38 form a second transport means. A second transport path 15A includes the second transport means. Reference numeral 26 designates a card discharge path. The second transport belt unit 37 and e third follower belt unit 39 form a third transport means. A collector path 29 includes the third transport means. A second flap 30 as a branchinh member selects the card discharge path 26 or the collector path 29 for the ATB pass 1 after it is cut by the cutter unit 14. A third flap 31 receives the magnetic card from the collector path 29 and guides it to one of collector boxes 27 and 28 located under the magnetic card reader. A stamper unit 32 prints an inspection mark on the ATB pass 1.

The drive motor 33 and the drive motor 5 are disposed side by side. A pulley 34 is fixed to the shaft 33a of the drive motor 33. A pulley 36a is fixed to a drive shaft 36, which is supported by the frames 8 and 9. A drive belt 35 is stretched between the pulley 34 and the pulley 36a. A drive roller 37a of the second transport belt unit 37 is fastened to the drive shaft 36. Transport rollers 37b and 37c are rotatably supported by the side walls (not shown). A belt 37d is stretched among the drive roller 37a, and the transport rollers 37b and 37c. In the second transport belt unit 37, the drive roller 37a, and the transport rollers 37b and 37c are disposed in a triangle fashion, with the cutter unit motor 25 being disposed at the center of the triangle.

The second follower belt unit 38 is disposed above the second transport belt unit 37, and the third follower belt unit 39 is disposed on the right side of the second transport belt unit 37. The second follower belt unit 38 includes transport rollers 38a, 38b, and 38c, and a belt 38d wound around those transport rollers. The third follower belt unit 39 includes transport rollers 39a and 39b, and a belt 39c wound around those rollers. The drive roller 37a, the transport rollers 37b and 37c, and the transport rollers 38a, 38b, and 38c form a second transport roller group. The drive roller 37a, the transport rollers 37b and 37c, and the transport rollers 39a and 39b form a third transport roller group. The belt 38d is pressed against the belt 37d in the region between the drive roller 37a and the transport roller 37b, and the belt 39c is pressed against the belt 37d in the region between the drive roller 37a and the transport roller 37c.

A pad roller 47, which is in press contact with the belt 38d, is disposed in the vicinity of the transport roller 38a. The card discharge path 26 connects at one end to the exit slit 4 and at the other end to the second transport path 15A. The card discharge path 26 is slanted upward in the magnetic card reader. The card discharge path 26 discharges the pass 1A.

The collector path 29 is provided for transportation of the coupon 1B. One end of the collector path 29, located closer to the drive roller 37a and the transport roller 39a, is connected to the second transport path 15A through a second flap 30. The other end of the collector path 29, located closer to the transport roller 37c and the transport roller 39b, is connected to the collector boxes 27 and 28 through a third flap 31. The collector path 29 is extended so as to return to the entrance slit 3.

Figure 4:
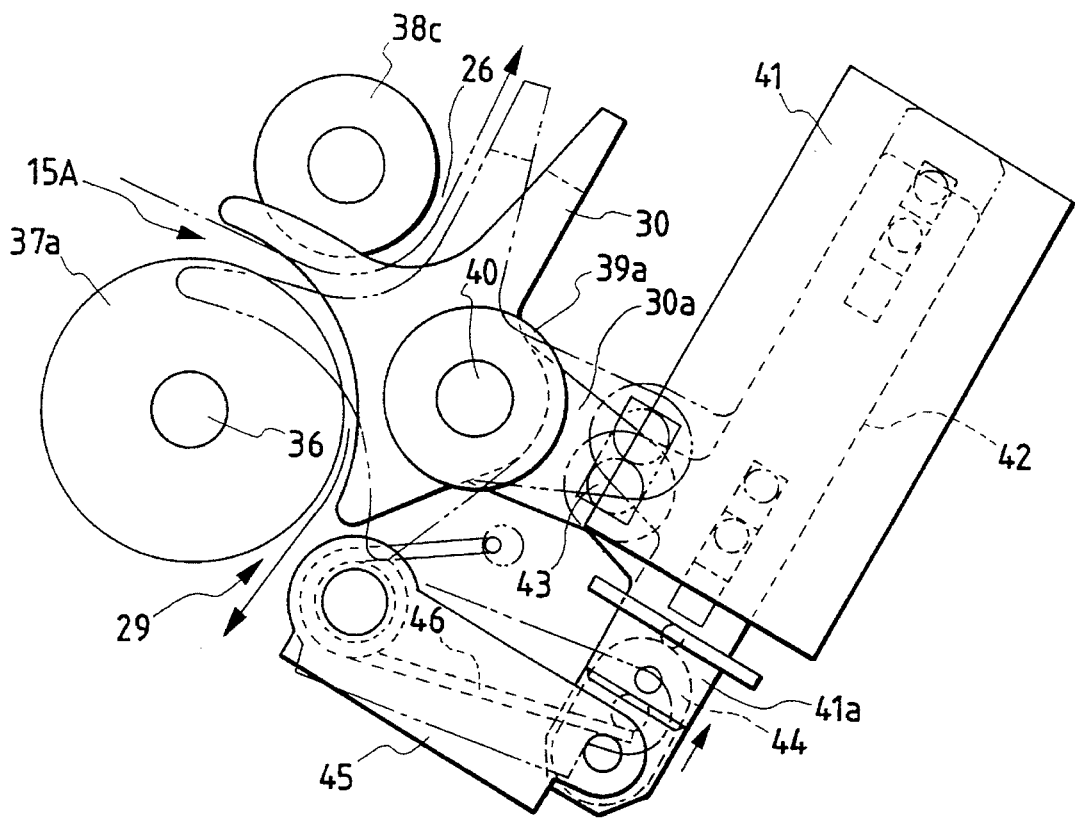
FIG. 4 is an enlarged side view showing another key portion of the magnetic card reader of the first embodiment, the illustration being useful in explaining a mechanism including a second flap and its operation.

The second flap 30 is rotatably supported at a flap shaft 40, which supports the transport roller 39a. As shown in FIG. 4, the second flap 30, trifurcated in shape, is disposed at a portion where the second transport path 15A, the card discharge path 26, and the collector path 29 intersect. The second flap 30 is selectively turned to a first position or a second position by a magnetic solenoid 41. When the second flap 30 is set at the first position (indicated by a solid line), the collector path 29 is connected to the second transport path 15A. When it is set at the second position (indicated by a two-dot chain line), the card discharge path 26 is connected to the second transport path 15A. An arm 30a of the second flap 30 is coupled by means of a pin with a movable plate 42 coupled with a movable member 41a of the magnetic solenoid 41 through a swingable coupling lever 45 and a coupling plate 44 which is coupled with the coupling lever 45 by means of a pin. A spring 46 is provided on the coupling lever 45. With the aid of the spring 46, the movable member 41a urges the second flap 30 to the first position indicated by the solid line. The magnetic solenoid 41, when energized, moves backward the movable member 41a, and the second flap 30 is turned from the first position to the second position indicated by the two-dot chain line.

Figure 5:
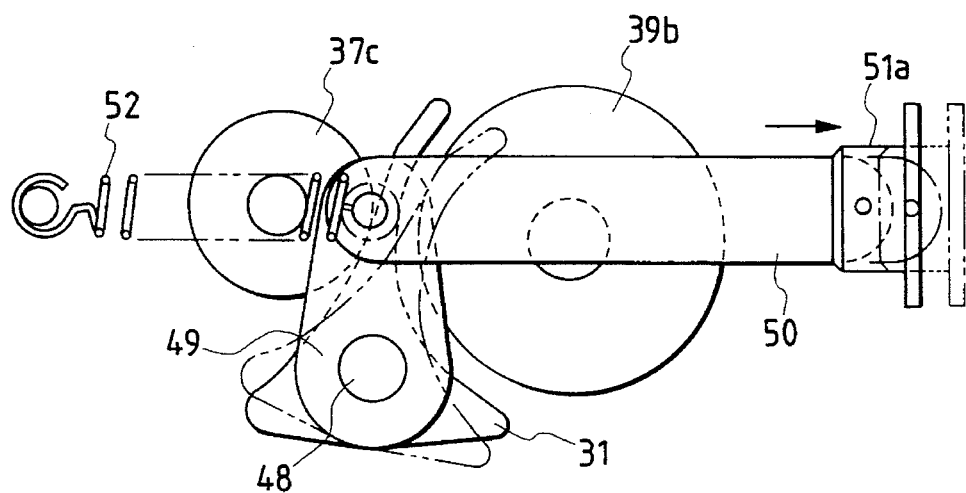
FIG. 5 is an enlarged side view showing another key portion of the magnetic card reader of the first embodiment, the illustration being useful in explaining a mechanism including a third flap and its operation.

As shown in FIGS. 1 and 5, the third flap 31 is disposed at the fore end of the collector path 29 in a state that it is supported by a flap shaft 48 located between the transport roller 37c and the transport roller 39b. The flap shaft 48 is coupled with a movable peace 51a of an electromagnetic solenoid 51, by way of levers 49 and 50. The third flap 31 may be swung about the flap shaft 48. A spring 52 is coupled with a connection part of the levers 49 and 50. The spring 52 urges the third flap 31 to a position (indicated by a solid line). At this position, the collector path 29 communicates with the collector box 28 between the transport roller 39b and the third flap 31. When the electromagnetic solenoid 51 is driven, the third flap 31 is turned to a position indicated by a two-dot chain line. At this position, the collector path 29 communicates with the collector path 29, between the transport roller 37c and the third flap 31. The electromagnetic solenoid 51 is driven in accordance with a select mode set up in a control unit not shown. The class of seat, a destination, and the like are examples of the select mode. The control unit detects the select mode when the paired magnetic heads 13A and 13B read information out of the ATB pass, and drives the electromagnetic solenoid 51 to turn the third flap 31. Alternatively, the third flap 31 may manually be turned if a select switch is provided which is exclusively used for operating the third flap 31.

The collector boxes 27 and 28, which are for collecting the coupon 1B but may be used for collecting the ATB pass 1, are accommodated in the magnetic card reader 2. Each of the collector boxes 27 and 28 is longer than the entire length L of the ATB pass 1. Within the magnetic card reader, those boxes are disposed on both sides of the third flap 31. In other words, the fore end of the collector path 29 is positioned so as to allow the collector boxes 27 and 28 to be disposed side by side within the magnetic card reader 2.

As shown in FIGS. 1 and 2, the stamper unit 32 is disposed downstream of the cutter unit 14 on the second transport path 15A. Simultaneously with the operation of the cutter unit 14, the stamper unit 32 is operated and moved by an actuator not shown to the second transport path 15A, and stamps inspection marks on the pass 1A and the coupon 1B which are cut magnetic cards formed by the cutter unit 14. When the cutter unit 14 and the stamper unit 32 or only the stamper unit 32 is driven, the drive motor 33 is driven again.

A card sensor S6 is provided for the card discharge path 26 located between the second flap 30 and the pad roller 47, and a card sensor S7 is provided for the collector path 29 located between the drive roller 37a and the transport roller 39b.

The card sensor S6 is for detecting the pass 1A being transported along the card discharge path 26. When it detects the pass 1A being transported, a sensor signal produced therefrom stops the magnetic solenoid 41, and also stops the drive motors 5 and 33. The card sensor S7 is for detecting the detects the coupon 1B, a sensor signal produced there from stops the drive motor 5 and the drive motor 33.

A card sensor S5 is located downstream of the stamper unit 32 on the second transport path 15A. The card sensor S5 detects the cut magnetic card transported after an ATB pass 1 is cut by the cutter unit 14. When the card sensor S7 detects the later transported magnetic card, a sensor signal produced stops the drive motors 5 and 33 temporarily.

Figure 7:
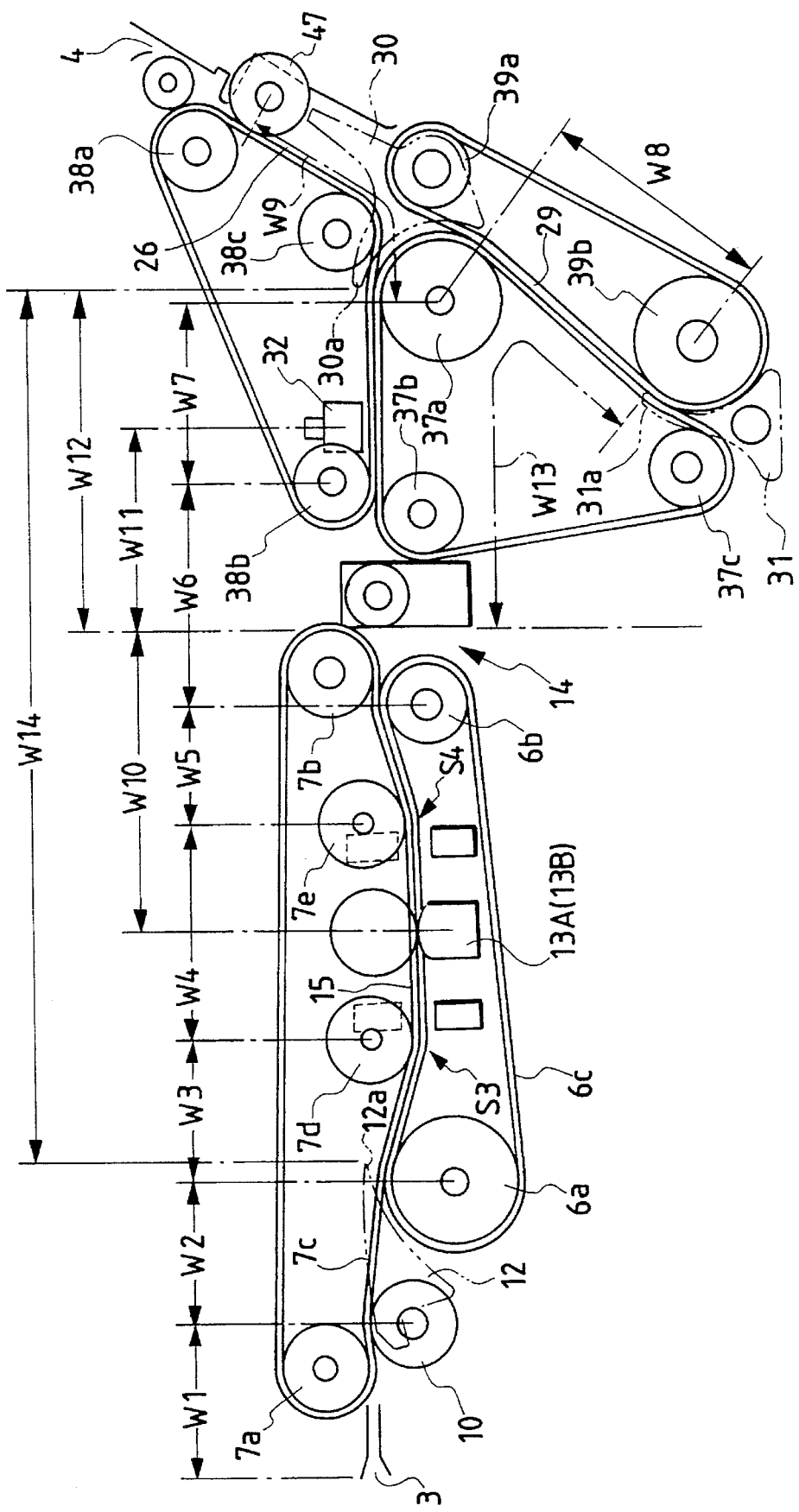
FIG. 7 is a side view showing a layout of transport rollers and respective mechanisms in the magnetic card reader of the first embodiment.

The following distances W6 to W9 are each shorter than the entire length L1 of the pass 1A as shown in FIG. 7:

W6=distance between the center of rotation of the follower roller 6b located in the first transport path 15 and the center of rotation of the transport roller 38b located in the second transport path 15A, W7=distance between the transport roller 38b and the drive roller 37a, W8=distance between the center of rotation of the drive roller 37a in the collector path 29 and the center of rotation of the transport roller 39b, and W9=distance between the center of rotation of the drive roller 37a in the card discharge path 26 and the center of rotation of the pad roller 47.

With such an arrangement of the rollers, the pass 1A as a shortest parted magnetic card is transported in a state that it is sandwiched between the belts extending over the respective rollers.

A distance W11 between the cutting position of the cutter unit 14 and the center of the stamper unit 32 is shorter than the entire length L1 of the pass 1A. A distance W12 between the cutting position of the cutter unit 14 and the tip 30a of the second flap 30 located in the second transport path 15A is longer than the entire length L1 of the pass 1A. A distance W13 between the cutting position of the cutter unit 14 and the tip 31a of the third flap 31 located in the collector path 29 is longer than the entire length L2 of the coupon 1B. A distance W14 from the first transport path 15 in which the tip 12a of the first flap 12 is positioned, to the second transport path 15A in which the tip 30a of the second flap 30 is positioned, is somewhat longer than the entire length L of the ATB pass 1 shown in FIG. 6.

The operation of the magnetic card reader 2 thus constructed will be described.

An ATB pass 1 is inserted into the magnetic card reader 2, through the entrance slit 3. If the sensors S1 and S2 detect that the width d of the ATB pass 1 is proper, the electromagnetic solenoid 24 is driven, the shutter 11 is opened, the first flap 12 retracts from the first transport path 15, the drive motors 5 and 33 are turned in the forward direction, and the belts 6c and 37d are turned clockwise. When the belt 6c is turned, the endless belts 7c being in contact with the belt 6c is turned counterclockwise, the pull-in roller 10 is turned, the leading edge of the ATB pass 1 is nipped between the pull-in roller 10 and the endless belts 7c and fed into the magnetic card reader, and is transported onto the first transport path 15 between the belt 6c and the endless belts 7c. The ATB pass 1 passes the card sensor S3 and advances toward the paired magnetic heads 13A and 13B.

When the belt 37d is turned, the belts 38d and 39c that are in contact with the belt 37d are turned counterclockwise, and the second and the third transport means are driven. Here, the magnetic card reader is ready for the transport of the ATB pass 1 from the first transport path 15. The second flap 30 is placed at the initial position (indicated by a solid line shown in FIG. 4). Accordingly, the second transport path 15A communicates with the collector path 29. When the ATB pass 1 reaches the paired magnetic heads 13A and 13B, it is nipped between the paired magnetic heads 13A and 13B and the paired pad rollers 17A and 17B. The magnetic heads read information from the magnetic stripe 1a of the ATB pass 1 that is in contact with the heads, and the ATB pass 1 is transported to the collector path 29 through the first transport path 15, the cutter unit 14, and the second transport path 15A.

The contents of the data recorded in the ATB pass 1 are checked through the readout operation by the paired magnetic heads 13A and 13B. If neither read error nor alteration of the recorded data is present, viz., there is no need of writing data into the ATB pass 1, the drive motors 5 and 33 are temporarily stopped after a preset time elapses since the trailing edge of the ATB pass 1 passes the card sensor S3, and at the same time the first flap 12 and the shutter 11 are returned to the positions in the first transport path 15. When the drive motors 5 and 33 are temporarily stopped, the cutter unit 14 and the stamper unit 32 are driven, and when the drive of the cutter unit and the stamper unit terminates, the drive motor 33 is driven again.

In this embodiment, the time that the drive motors 5 and 33 are temporarily stopped is coincide with the time that the perforation 1b of the ATB pass 1 reaches a cutting position of the cutter unit 14. When the ATB pass 1 is inserted in the forward direction, the fore part of the ATB pass 1 is the coupon 1B. Following the reading operation by the paired magnetic heads 13A and 13B, the cutter unit 14 and the stamper unit 32 are driven so that the coupon 1B is cut off from the ATB pass 1 while at the same time an inspection mark is stamped thereon. The drive motor 33 is driven again, and the third transport means is driven to transport the coupon 1B into the collector path 29. The coupon 1B is thus introduced into the collector path 29 and is led to the collector box 27 or the collector box 28 according to the position of the third flap 31 that is determined by a select mode. The select mode is detected when the magnetic head 13A reads data from the ATB pass 1.

When the coupon 1B passes above the card sensor S7, the magnetic solenoid 41 is driven, so that the second flap 30 is turned from the first position (indicated by a solid line in FIG. 4) to the second position (indicated by a two-dot chain line). The second transport path 15A communicates with the card discharge path 26. The drive motor 5 is driven again. The pass 1A that was left on the first transport path 15 is transported to the second transport path 15A. It is detected by the card sensor S5. Then, the drive motors 5 and 33 are temporarily stopped again. The stamper unit 32 is driven to stamp an inspection mark on the pass 1A. When the drive of the stamper unit 32 terminates, the drive motors 5 and 33 are driven again, and the pass 1A is guided into the card discharge path 26 by the second flap 30. The pass 1A is then discharged from the exit slit 4 by the cooperation of the second follower belt unit 38 and the pad roller 47.

The operation of the magnetic card reader when the ATB pass 1 is inserted in the reverse direction will be described.

When the magnetic head 13B reads data from the magnetic stripe 1a on the ATB pass 1, the magnetic card reader decides that the ATB pass 1 has been inserted in the reverse direction. Also in this case, the ATB pass 1 is transported in the magnetic card insertion direction (arrow C) till the reading operation by the magnetic head 13B ends. The ATB pass 1 passes above the card sensor S3 and is transported a preset distance. The drive motors 5 and 33 are temporarily stopped. The first flap 12 is positioned in the first transport path 15, so that the branch path X communicates with the first transport path 15.

As recalled, a signal produced by the card sensor S3 stops the ATB pass 1 (that is inserted in the forward direction) when the perforation 1b reaches the cutting position of the cutter unit 14. Therefore, when the ATB pass 1 is inserted in the reverse direction, the perforation 1b of the ATB pass 1 is not coincident with the cutting position of the cutter unit 14. Further, the fore part of the ATB pass 1 is the pass 1A. Therefore, it is necessary to turn the second flap 30 from the first position to the second position. In the first position, the second transport path 15A communicates with the collector path 29. In the second position, the second transport path 15A communicates with the card discharge path 26.

When the magnetic card reader decides that the ATB pass 1 has been inserted in the reverse direction, the drive motors 5 and 33 are driven counterclockwise, and the ATB pass 1 that has been read and at a standstill is transported in the return direction of an arrow E. The ATB pass 1 is guided to the branch path X by the first flap 12. At this time, the card sensor S3 senses the trailing edge of the ATB pass 1. Then, the stepwise turn of the drive motors 5 and 33 is counted a preset number of steps, and the drive motors 5 and 33 are temporarily stopped again. At the preset number of steps, the perforation 1b of the ATB pass 1 being transported in the reverse direction is positioned at the cutting position of the cutter unit 14.

When the drive motors 5 and 33 being turned in the reverse direction are stopped, the cutter unit 14 and the stamper unit 32 are driven. The drive motor 33 is turned in the forward direction. Further, the magnetic solenoid 41 is energized to turn the second flap 30 from the first position to the second position. As state above, in the first position, the second transport path 15A communicates with the collector path 29. In the second position, the second transport path 15A communicates with the card discharge path 26. By the operation of the related components, the pass 1A is cut off from the ATB pass 1 and stamped, guided from the second transport path 15A to the card discharge path 26 by the second flap 30, and discharged from the exit slit 4.

When the pass 1A passes above the card sensor S6, the magnetic solenoid 41 is deenergized, the second flap 30 is turned from the second position (indicated by a two-dot chain line in FIG. 4) to the first position (indicated by a solid line), so that the second transport path 15A is connected to the collector path 29. The drive motor 5, which has been temporarily stopped, is driven again. The coupon 1B, which was left on the first transport path 15, is transported to the second transport path 15A. When it is detected by the card sensor S5, the drive motors 5 and 33 are temporarily stopped, and the stamper unit 32 is driven to stamp an inspection mark on the coupon 1B. When the stamper unit 32 is driven, the drive motors 5 and 33 are driven, and the coupon 1B is guided into the collector path 29 by the second flap 30. The guided coupon 1B is transported to the collector path 29 by the second follower belt unit 38, which is driven by the drive motor 33, and the third follower belt unit 39. It is introduced into the collector box 27 or the collector box 28 by the third flap 31. When the coupon 1B passes above the card sensor S7 in the collector path 29, the magnetic card reader decides that the ATB pass 1 is completely discharged out of the reader, stops the drive motors 5 and 33, and ready for the processing of the next ATB pass 1.

The operation of the magnetic card reader when an error occurs in the operations of writing and reading data to and from an ATB pass 1 by the paired magnetic heads 13A and 13B, will be described.

When information, for example, the name of a passenger, which is recorded in the magnetic stripe 1a of the ATB pass 1, is changed to another, the drive motors 5 and 33 are reversely turned, the magnetic head 13A or 13B reads out information, and the ATB pass 1, which is partially set in the collector path 29 and stopped at a reserving position, is moved backward.

When the leading edge of the ATB pass 1 being moved backward is detected by the card sensor S4, the magnetic head 13A or 13B is selected depending on the direction (forward or reverse) of the inserted ATB pass 1, and new information is written into the magnetic stripe 1a from an input device, such as a keyboard (not shown). Then, the ATB pass 1 is guided to the branch path X by the first flap 12. When the trailing edge of the ATB pass 1 being moved backward is detected by the card sensor S3, the drive motors 5 and 33 are stopped, and driven again in the forward direction (clockwise). The ATB pass 1, after processed for writing new information thereinto, is moved toward the cutter unit 14. During the course of the transportation of the ATB pass 1, the updated information in the magnetic stripe 1a is read out by the magnetic head 13A or 13B. If no read error is produced in the reading operation, the ATB pass 1 is cut into a pass 1A and a coupon 1B, and those are trasnported to the card discharge path 26 and the collector path 29, respectively.

When an error is produced in the reading operation, the drive motors 5 and 33 are reversely turned as in the case of the writing operation, and the ATB pass 1 is moved backward into the branch path X. When the trailing edge of the ATB pass 1 pass above the card sensor S3, the drive motors 5 and 33 are temporarily stopped and then turned in forward direction. Either of the paired magnetic heads 13A and 13B reads information from the magnetic stripe 1a again or retries to read information out of the magnetic stripe. If the information is normally read, the cutter unit 14 operates to cut the ATB pass 1 into a pass 1A and a coupon 1B, and those separated ones are transported to the card discharge path 26 and the collector path 29.

The stamper unit 32 is located downstream of the cutter unit 14, and the distance W11 between the cutting position of the cutter unit 14 and the center of the stamper unit 32 is shorter than the entire length L1 of the pass 1A. With this arrangement, the cutting operation and the stamping operation can be performed simultaneously. In the conventional device, these operations are performed separately.

The distance W12 between the cutting position of the cutter unit 14 and the tip 30a of the second flap 30, and the distance W13 between the cutting position of the cutter unit 14 and the tip 31a of the third flap 31 are each longer than the entire length Li of the pass 1A and the entire length L2 of the coupon 1B. Therefore, when the ATB pass 1 is reversely inserted or when it is forwardly inserted and stops at the reserving position, the ATB pass 1 will never interfere with the flaps.

The distance between the adjacent rollers of the roller group is shorter than the entire length L1 of the pass 1A. Therefore, the first transport path 15, the second transport path 15A, the card discharge path 26, and the collector path 29 may be minimized, whereby the transportation of the pass 1A is made possible. Further, the first flap 12 is located downstream of the entrance slit 3. Because of this, the ATB pass 1 that is inserted in the reverse direction is guided into the spare space Y located in the lower portion of the magnetic card reader, not to the entrance slit 3. With this, the distance from the entrance slit 3 to the paired magnetic heads 13A and 13B may be reduced. In the conventional device, the distance must be longer than the entire length L of the ATB pass 1.

In the present embodiment, the collector boxes 27 and 28 are used for collecting the coupons 1B. However, these boxes may be used for collecting the ATB pass 1 since the size of the collector boxes is so selected. Accordingly, in such a case that after the retry of reading the ATB pass 1, a read error is still present, the ATB pass may be guided to the collector path 29 and then to either of the collector boxes 27 and 28. When the magnetic card reader is not used, ATB passes 1 before use may be stored in those collector boxes.

Figure 8:
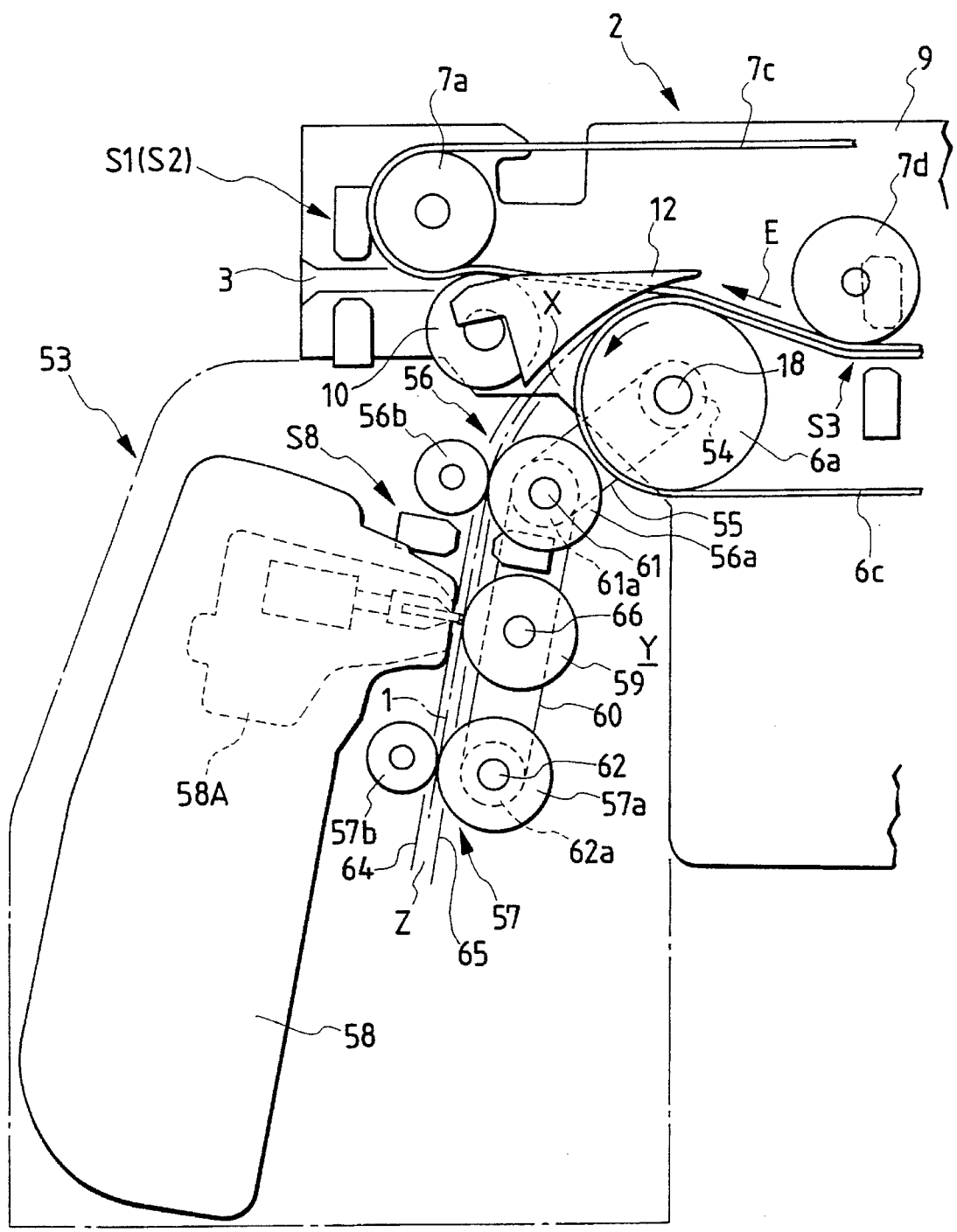
FIG. 8 is a side view showing a magnetic card reader with a printer attached thereto, which is a second embodiment of the present invention.

A second embodiment of a magnetic card reader according to the present invention will be described with reference to FIG. 8. In the second embodiment, a printer 53 is attached to the magnetic card reader 2 of the first embodiment. In the figure, like reference numerals are used for designating portions similar or equivalent to those of the first embodiment, for simplicity.

As shown, the printer 53 is removably set to a location of the spare space Y under the first flap 12. The printer 53 is formed of a retracting path Z which communicates with the branch path X when the printer is set to the card reader, two pairs of rollers 56 and 57 facing the retracting path Z, a thermal head 58A located between the paired rollers 56 and 57, and a platen roller 59.

The retracting path Z is located between guide plates 64 and 65. The drive rollers 56a and 57a of the paired rollers 56 and 57, which are located closer to the guide plate 65, are fastened to shafts 61 and 62. These shafts 61 and 62 are rotatably supported by a frame (not shown) of the printer 53. Follower rollers 56b and 57b are in contact with the drive rollers 56a and 57a, respectively. The platen roller 59, facing the thermal head 58A, is fastened to a shaft 66, which is rotatably supported by the frame (not shown).

A double pulley 61a is fastened to the shaft 61. A pulley 62a is fastened to the shaft 62. A belt 60 is stretched between one of the grooves of the double pulley 61a and the pulley 62a. A drive pulley 54 is fastened to the drive shaft 18. A belt 55 is stretched between the other groove of the double pulley 61a and the drive pulley 54. With this arrangement, the paired rollers 56 and 57 are turned in the same direction as the drive roller 6a. The size and the pulley diameter of the drive rollers 56a and 57a are adjusted so that these turn at the same angular speed as the drive roller 6a. The pitch between the transport roller pair 56 and the platen roller 59, and between the platen roller 59 and the transport roller pair 57 is shorter than the entire length L1 of the pass 1A. In the present embodiment, the platen roller 59 is of the follower type. If required, the following modification is allowed: A pulley is fastened to the shaft 66, and the pulley is coupled with the drive roller 6a by a belt.

A card sensor S8 is disposed in the retracting path Z located between the transport roller pair 56 and the platen roller 59. When the card sensor S8 detects the ATB pass 1 in an updating mode of the magnetic information, the ATB pass 1 is moved a preset distance, and then the thermal head 58A enters into the retracting path Z. The preset distance is set so that the leading edge of the ATB pass 1 passes through a portion between the thermal head 58A and the platen roller 59. A preset number of steps of the drive motor 5 is assigned to the preset distance in advance.

The thermal head 58A is of the direct type in which the head operates for print in accordance with information applied thereto, while it is in contact with the surface of the ATB pass 1. The thermal head 58A is coupled with a ribbon cartridge 58. The thermal head 58A is supported by a frame (not shown) such that it is moved to and from the retracting path Z. The thermal head is placed out of the retracting path Z in a normal state. In a write mode of the magnetic card reader, when the card sensor S8 detects the ATB pass 1, the head is moved to the retracting path Z and heated.

In the magnetic card reader 2 with the printer 53 thus arranged, to alter the data stored in the ATB pass 1, as in the first embodiment, the drive motor 5 is turned counterclockwise, the ATB pass 1 is moved backward. During the course of the backward movement, either of the paired magnetic heads 13A and 13B is operated to alter the recorded data. Then, the ATB pass 1 is guided to the branch path X by the first flap 12. The ATB pass 1, which was guided to the branch path X, is transported into the retracting path Z by the belts 6c and 7c, and is pinched by the transport roller pair 56 to be moved toward the thermal head 58A. When the leading edge of the ATB pass 1 is detected by the card sensor S8, the thermal head 58A advances into the retracting path Z and thermally prints characters on the surface of the card. Upon completion of the printing operation, the drive motor 5 is forwardly turned to transport the ATB pass 1 containing the corrected information to the first transport path 15.

That is, the printer 53 is placed in the spare space Y under the first flap 12, which is located between the entrance slit 3 and the magnetic head pair 13A and 13b. Thus, the print on the ATB pass 1 may be altered by the printer 53. In other words, since the printer 53 is located under the first transport path 15, the printer 53 may be attached to the magnetic card reader 2 without extending the first transport path. Accordingly, the machine can be made compact.

Further, since the printer 53 is removably set to the space Y, the printer 53 may be removed at any time if a user desires so. Accordingly, the range of choice by the user is increased. Additionally, it is noted that in the write or retry mode, the ATB pass 1 is not returned to the entrance slit 3. This feature eliminates the reinsertion of the ATB pass 1, and hence reduces the time taken for the card processing.

Figure 9:
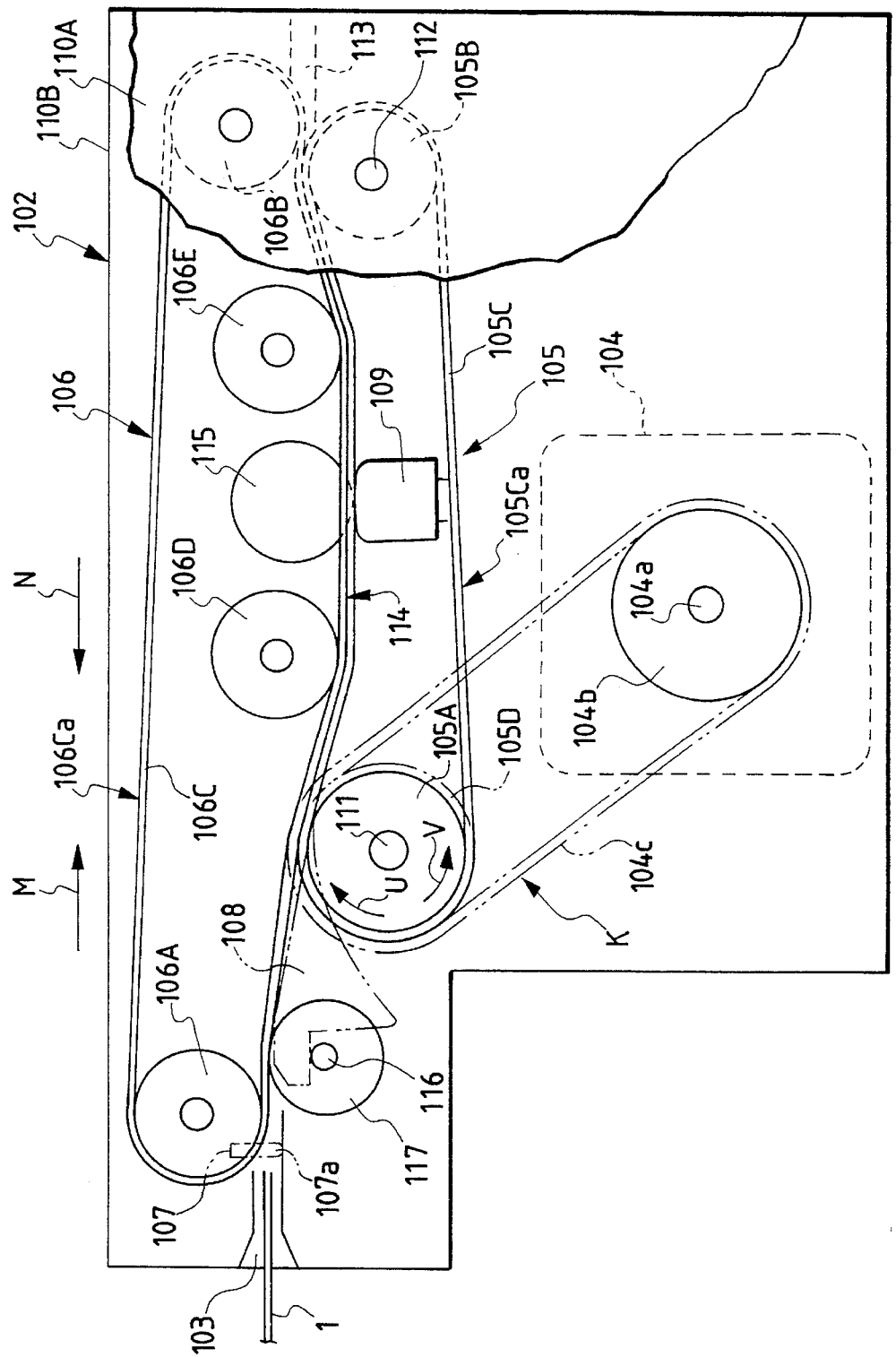
FIG. 9 is a side view showing a forward/reverse transport mechanism according to a third embodiment of the present invention.
Figure 10:
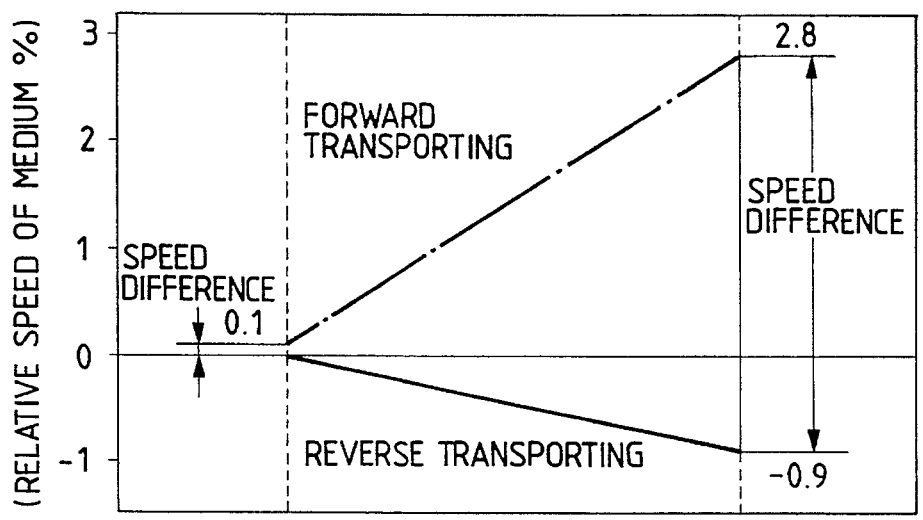
FIG. 10 is a graph showing variations of the relative speed of an ATB pass being transported forwardly and reversely when the friction coefficient of the drive belt surface is equal to and larger than that of the follower belt surface in the forward/reverse transport mechanism.

A third embodiment of a magnetic card reader according to the present invention will be described with reference to FIGS. 9 to 11.

In the first embodiment already described, the first transport path 15 is curved. When an ATB pass 1 is transported in the forward direction and the reverse direction along the curved first transport path, while being nipped between the transport surface of the drive belt and the transport surface of the follower belt, both the belts having equal friction coefficients, the transport speed of the ATB pass when it is transported in the forward direction is greatly different from that of the ATB pass when it is transported in the reverse direction. Therefore, it is impossible to secure an exact process of writing and reading information to and from the ATB pass. The reason for this that can be considered will be described with reference to FIG. 11.

Figure 11:
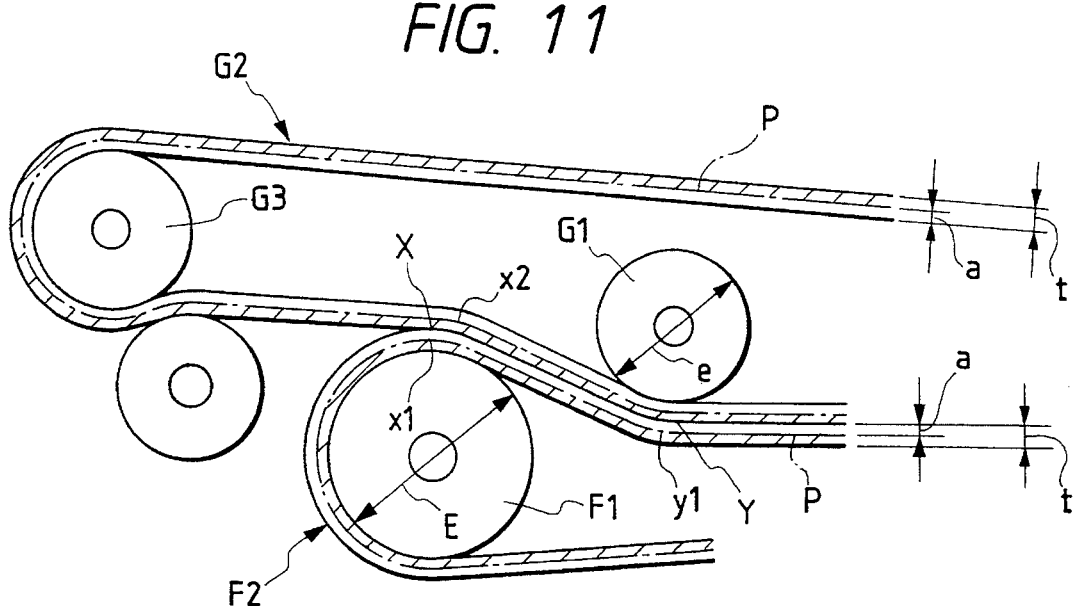
FIG. 11 is a side view useful in explaining a difference between a transport speed of the drive belt and that of the follower belt in the third embodiment.

For example, assuming that a drive belt F2, which is put on a drive roller F1 of diameter E, consists of a first belt layer of a thickness of and a second belt layer of a thickness of (t–a), and the transport surface speed of the drive belt F2 at a point X in FIG. 11 is S. Then, a transport speed of the drive belt F2, which is put on the drive roller F1, at a point x1 on a pitch line (indicated by P) is given by $$S \times \{E+2(t-a)\}/(E+2t) \qquad (1)$$

The equation (1) teaches that the transport speed is slower than the transport surface speed S.

Accordingly, in a follower roller G1, if the transport surface speed at a point y1 on the pitch line of the drive belt F2 is equal to that expressed by the equation (1), the transport surface speed of the drive belt F2 on the follower roller G1 is given by $$(1) \times (\text{diameter e of the follower roller G1} +2t)/(e+2t+2a). \qquad (2)$$

The speed is further slower than the transport speed obtained by equation (1).

Similarly, it is assumed that a transport surface speed of another follower belt G2 at a point X is equal to the transport surface speed S of the drive belt F2. On this assumption, a transport surface speed of the follower belt G2 on the drive roller F1 at a point x2 on the pitch line thereof is expressed by $$S \times \{E+2t+2(t-a)\}/(E+2t) \qquad (3)$$

The equation (3) teaches that the transport surface speed of the follower belt G2 at the point x2 is somewhat slower than the transport surface speed S. A transport surface speed of the follower belt G2 on the follower roller G1 is $$(3) \times (e+2t)/(e+2a) \qquad (4)$$

The equation (4) shows that the transport surface speed of the follower belt G2 on the follower roller G1 is higher than the speed of the equation (3). Therefore, (2)<(4).

From the above description, it is seen that when the transport path is curved, a speed difference is inevitably produced between the drive belt F2 and the follower belt G2.

When an ATB pass is transported while being nipped with the transport surfaces of the belts F2 and G2 which are being moved at different speeds, the ATB pass is transported while being slipped on the belt surfaces. In addition to the speed difference of the belts and the slippage of the ATB pass, the curved state of the transport path makes the forward and reverse transporting states of the ATB pass more intricate. As a result, a transport speed difference is actually produced between the forward and the backward transportation of the ATB pass.

Where the transport speed of the ATB pass being transported in the forward direction is different from the transport speed of the pass being transported in the reverse direction, an exactness of the reading/writing operation is lost when the reading operation is performed during the forward transportation of the ATB pass, or the writing operation is performed during the reverse transporation. If the reading/writing operation is inexact, the reading/writing operation must be repeated till correct data is read out of or written into the pass. This results in prolongation of a processing time.

To cope with the transport speed difference problem, in the third embodiment of the present invention, a friction coefficient on the transport surface of the drive belt is made different from that on the transport surface of the follower belt so as to minimize the transport speed difference of the ATB pass when it is transported in the forward direction and when it is transported in the reverse direction. With this, information can exactly be read out of and written into the ATB pass. The third embodiment is used for the first transport means in the magnetic card reader of the first embodiment.

A magnetic card reader 102 is made up of a forward/reverse transport mechanism K, a flap 108, and a magnetic head 109. The forward/reverse transport mechanism K includes a drive belt unit 105 and a follower belt unit 106, which is rotated with movement of the drive belt unit 105. The drive belt unit 105 is driven by a drive motor 104 as a drive source. The drive motor 104 is rotatable forwardly or clockwise (in the direction of an arrow U) or reversely or counterclockwise (in the direction of an arrow V). The flap 108 regulates the advancement of an ATB pass 1 in cooperation with a shutter 107 provided near an entrance slit 103. The magnetic head 109 is used for reading and writing information out of and into the ATB pass 1. The shutter 107, the flap 108, and the magnetic head 109 are disposed in this order in the direction from the entrance slit 103 to an exit side transport path 113.

In the follower belt unit 106, transport rollers 106A and 106B are disposed between a pair of frames 110A and 110B. A follower belt 106C is stretched between the transport rollers 106A and 106B. Rollers 106D and 106E are rotatably supported between the paired frames. These rollers 106D and 106E push the follower belt 106C downward. A pad roller 115 is disposed between the rollers 106D and 106E. The pad roller 115 applies a preset pad pressure to the magnetic head 109.

The drive belt unit 105 is disposed under the follower belt unit 106 while being aligned with the latter. The drive belt unit 105 is supported by a drive shaft 111 and a support shaft 112, which are also supported by the frames 110A and 110B. A drive roller 105A is fastened to the drive shaft 111. A follower roller 105B is rotatably supported by the drive shaft 111. A drive belt 105C is stretched between the drive roller 105A and the follower roller 105B, while being in contact with the follower belt 106C. A transport path 114 extends between the drive belt 105C and the follower belt 106C, both sides of which are defined by the frames 110A and 110B. One end of the transport path 114 terminates at the entrance slit 103, while the other end terminates at the exit side transport path 113. A belt pulley 105D is secured to the drive shaft 111 at a location off the transport path 114. A coupling belt 104c is wound around the belt pulley 105D and a drive pulley 104b. The drive pulley 104b is mounted on an output shaft 104a of the drive motor 104.

The magnetic head 109 is a combination head with both the reading and the writing functions. The magnetic head 109, located off the drive belt 105C, is disposed in the transport path 114 so as to align with the magnetic stripe 1a of an ATB pass 1 when the ATB pass reaches the location of the magnetic head. The magnetic head 109 is in contact with the pad roller 115 in the transport path 114. The magnetic head 109 reads information from the magnetic stripe 1a on the ATB pass 1 when the ATB pass 1 is transported in the forward insertion direction indicated by an arrow M. The magnetic head 109 writes information into the ATB pass 1 when it is transported in the reverse insertion direction indicated by an arrow N.

A pull-in roller 117 is disposed under the transport roller 106A in a state that it is in press contact with the follower belt 106C. The pull-in roller 117 is rotatably supported by a support shaft 116, which is rotatably supported by the frames 110A and 110B.

The flap 108, disposed in the transport path 114, is fixed securely to the support shaft 116 located apart from the drive belt 105C and the follower belt 106C. The shutter 107 is secured to the support shaft 116 in a state that the tip 107a is located in the transport path 114. The shutter 107 may be swung about the support shaft 116. The shutter 107 and the flap 108 are coupled with electromagnetic solenoid not shown. Those are urged to be placed in the transport path 114 in a normal state, to thereby close the entrance slit 103 and the transport path 114. When the electromagnetic solenoid is energized by a drive signal, the shutter 107 and the flap 108 are moved to retract from the transport path 114, to thereby open the entrance slit 103 and the transport path 114.

The drive motor 104 is a stepping motor. When the ATB pass 1 is inserted into the entrance slit 103 and when the magnetic information is again read, the drive motor 104 is driven to turn clockwise. When information is written into the ATB pass or improperly read out of the ATB pass, the drive motor 104 is turned counterclockwise. Such a control of the drive motor 104 is carried out by a control unit not shown.

A transport surface 105Ca and a transport surface 106Ca of the drive belt 105C and the follower belt 106C, which are made of rubber and each of which has a thickness of approximately 1 mm, are brought into contact with each other. Those belts are pressed by the pull-in roller 117 and the transport rollers 106D and 106E. The coefficient of friction of the transport surface 105Ca of the drive belt 105C is larger than that of the transport surface 106Ca of the follower belt 106C. The friction coefficient of the transport surface 105Ca is selected to be such a value as at least to transport the ATB pass 1.

In the magnetic card reader 102 thus constructed, when an ATB pass 1 is inserted into the entrance slit 103, the control unit not shown drives the drive motor 104 to turn the belt pulley 105D clockwise. At the same time, an actuator (not shown) is driven, so that the shutter 107 and the flap 108 retract from the transport path 114, to thereby open the entrance slit 103 and the transport path 114. When the belt pulley 105D is turned, the drive shaft 111 and the drive roller 105A are turned clockwise, and the drive belt 105C is turned clockwise, so that the follower belt 106C contacting therewith is turned counterclockwise.

When the follower belt 106C is turned, the pull-in roller 117 is turned, so that the inserted ATB pass 1 is pulled into the magnetic card reader 102 by the follower belt 106C and the pull-in roller 117. The ATB pass 1 is transported along the transport path 114 toward the magnetic head 109, while being nipped by the drive belt 105C and the follower belt 106C. During the transportation of the ATB pass 1, the ATB pass is drawn mainly by the transport surface 105Ca of a larger friction coefficient. The magnetic head 109 reads information out of the ATB pass 1 being transported. If no read error is detected, the ATB pass 1 is transported to a medium-deviding means with a cutter not shown. The ATB pass 1 is parted into a pass 1A and a coupon 1B by the medium-deviding means, and those are properly processed in the subsequent stages.

When a read error occurs or when information must be written, the drive motor 104 is reversely turned, and the ATB pass 1 is moved in the reverse direction indicated by an arrow N till it passes above the magnetic head 109. If the reverse movement of the ATB pass 1 is due to a read error, the drive motor 104 is forwardly turned again at a time when the ATB pass 1 passes the magnetic head 109. The ATB pass 1 is transported in the forward insertion direction, and the magnetic head 109 retries to read information from the ATB pass 1, and then the ATB pass 1 is transported toward the exit side transport path 113.

When information must be written into the ATB pass 1, the magnetic head 109 writes information into the magnetic stripe 1a of the ATB pass 1 when it is moved in the reverse direction. When the writing operation ends, the drive motor 104 is forwardly turned, and the magnetic head 109 reads the information written anew from the magnetic stripe 1a. If no read error is detected, the ATB pass 1 is transported to the exit side transport path 113. If a read error is detected, the drive motor 104 is reversely turned again, the ATB pass 1 is returned to the entrance slit 103 than the magnetic head 109. Then, the drive motor 104 is turned forwardly to transport the ATB pass 1 toward the magnetic head 109, and the magnetic head 109 retries to read information from the magnetic stripe 1a of the ATB pass 1. If no read error is detected, the ATB pass 1 is transported to the exit side transport path 113.

The transport speeds of the ATB pass 1 when it is moved in the forward direction and the reverse direction by the forward/reverse transport mechanism K thus constructed were measured above the magnetic head 109. The results of the measurement are as shown in FIG. 10. A speed difference of the ATB pass 1 when it is moved in the forward direction and in the reverse direction is plotted on the graph of FIG. 10. In the graph, the ordinate represents a relative speed (%) of the ATB pass 1, and the abscissa represents the combinations of the belts. The relative speed means a ratio of a speed difference between an actual transport speed of the ATB pass 1 and a reference transport speed thereof to the reference transport speed. That is, {[(actual transport speed)/ (reference transport speed)]−1}×100=relative speed (%).

When the coefficient of friction of the transport surface 105Ca of the drive belt 105C is larger than that of the transport surface 106Ca of the follower belt 106C, as in the present embodiment, the relative speed of the ATB pass 1 when it is moved in the forward direction is 0.1%, and is 0% when it is moved in the reverse direction. Little difference is present between the relative speeds. When the coefficient of friction of the transport surface 105Ca of the drive belt 105C is equal to that of the transport surface 106Ca of the follower belt 106C, as in the conventional magnetic card reader, the relative speed of the ATB pass 1 when it is moved in the forward direction is 2.8%, and is −0.9% when it is moved in the reverse direction. The difference between the relative speeds of the forward and reverse transportation is 3.7%.

To make the relative speed of the ATB pass 1 being forwardly transported equal to that of the ATB pass 1 being reversely transported, it is necessary to make the friction coefficient of the transport surface 105Ca of the drive belt 105C different from that of the transport surface 106Ca of the follower belt 106C, more preferably to set the friction coefficient of the transport surface 105Ca to be larger than o that of the transport surface 106Ca. If the friction coefficients of the transport surfaces are so selected, the ATB pass 1 is transported in both the forward and the reverse directions (of the arrows M and N) at stable transport speeds. Accordingly, the magnetic head 109 stably and correctly performs the read and write operations.

A fourth embodiment of the present invention will be described with reference to FIGS. 12 to 15. In the fourth embodiment, a magnetic card reader is provided with a stacking unit which contains a stack of ATB passes arranged properly.

Figure 12:
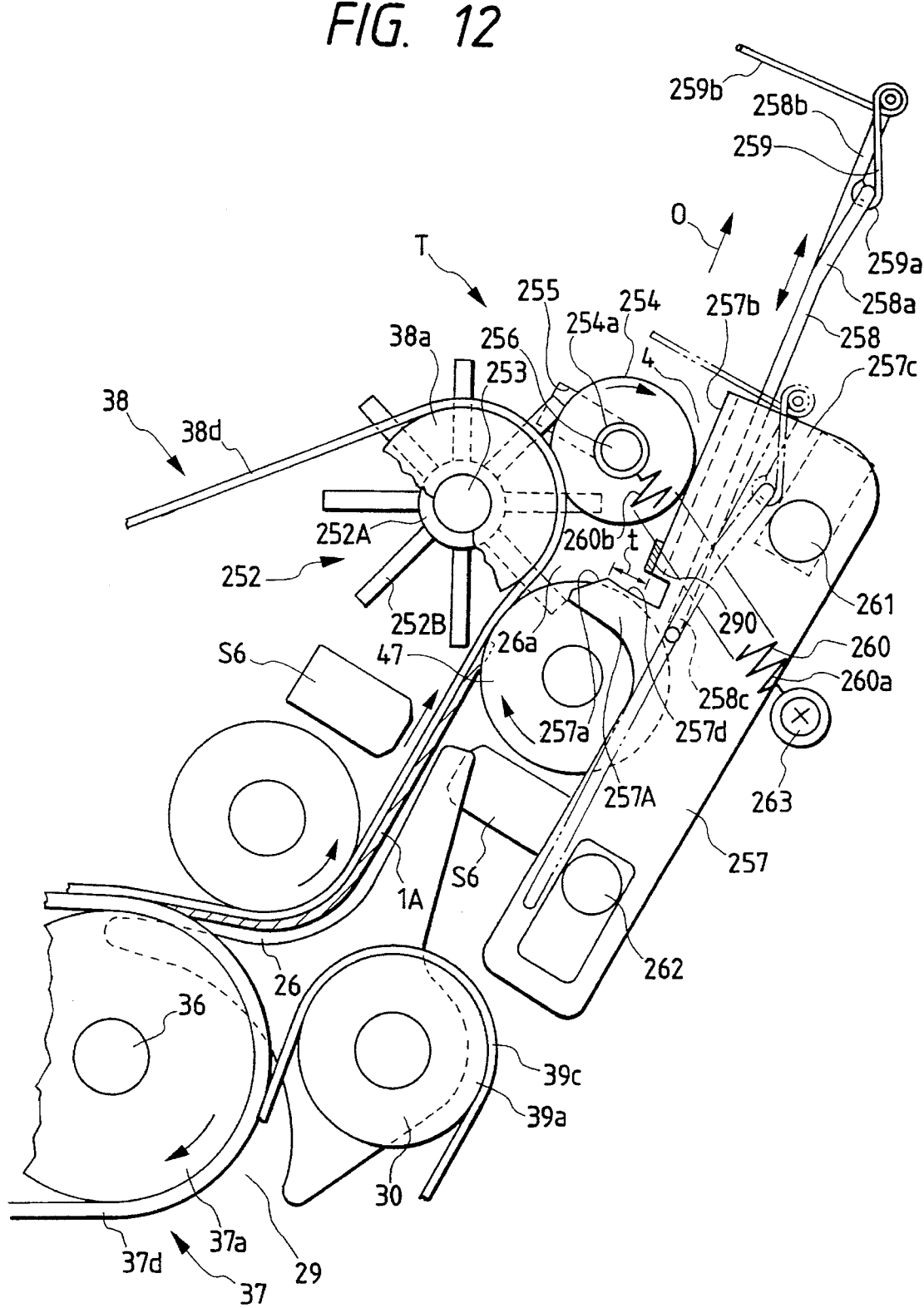
FIG. 12 is an enlarged side view showing a stacking unit assembled into the magnetic card reader, which is a fourth embodiment of the present invention.
Figure 13:
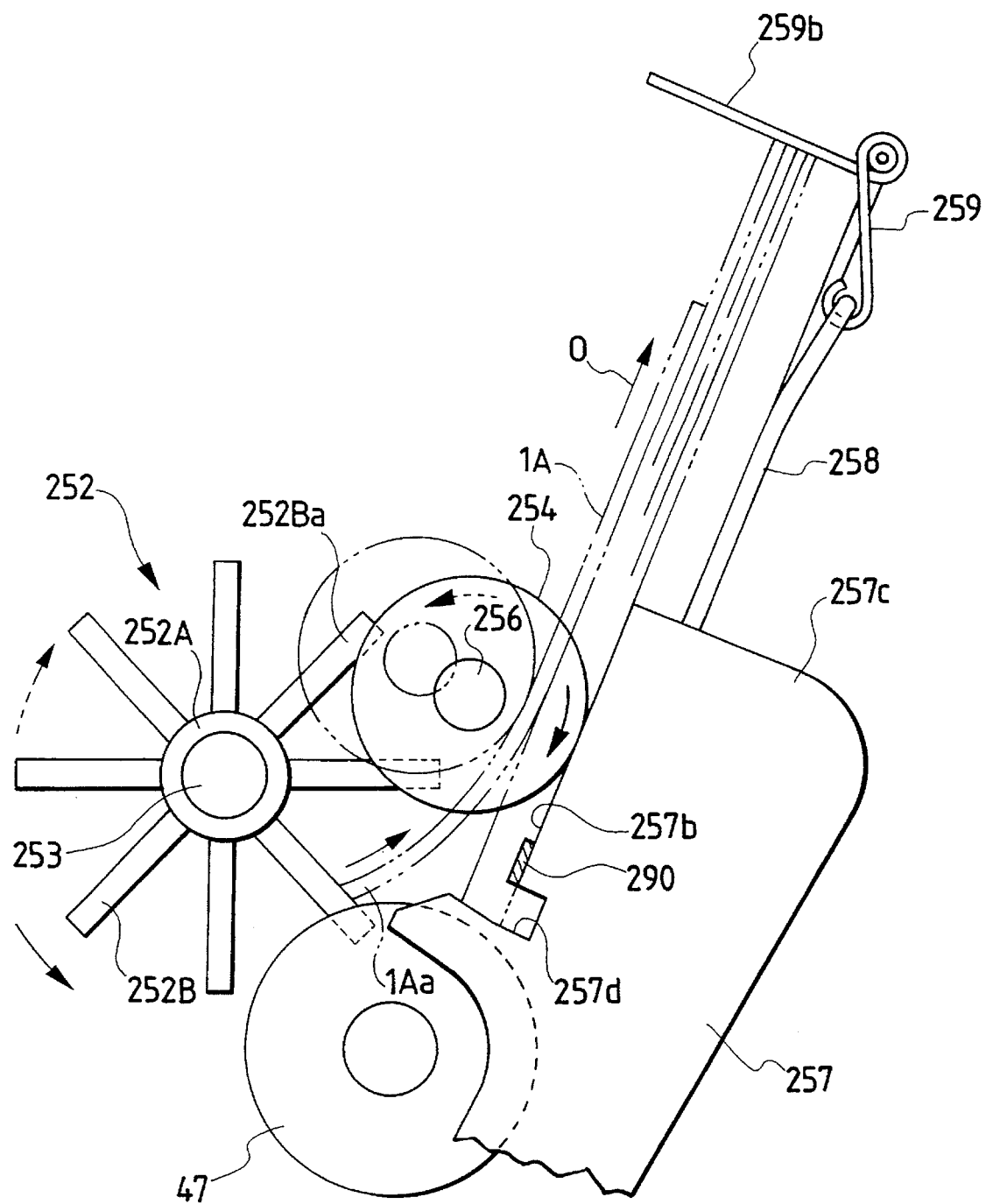
FIG. 13 is a side view useful in explaining the operation of the stacking unit shown in FIG. 12.
Figure 14:
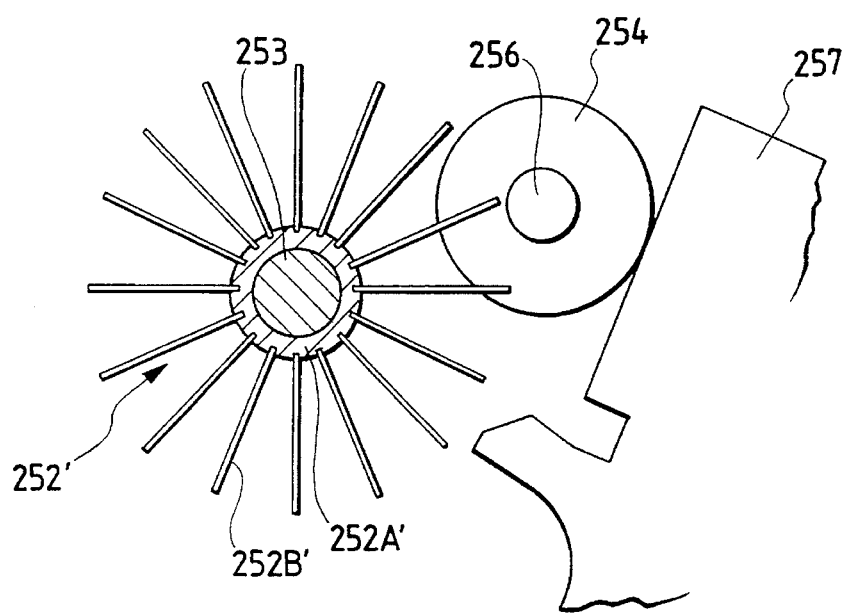
FIG. 14 is a side view, partly broken, showing a modification of a card hold roller used in the fourth embodiment.
Figure 15:
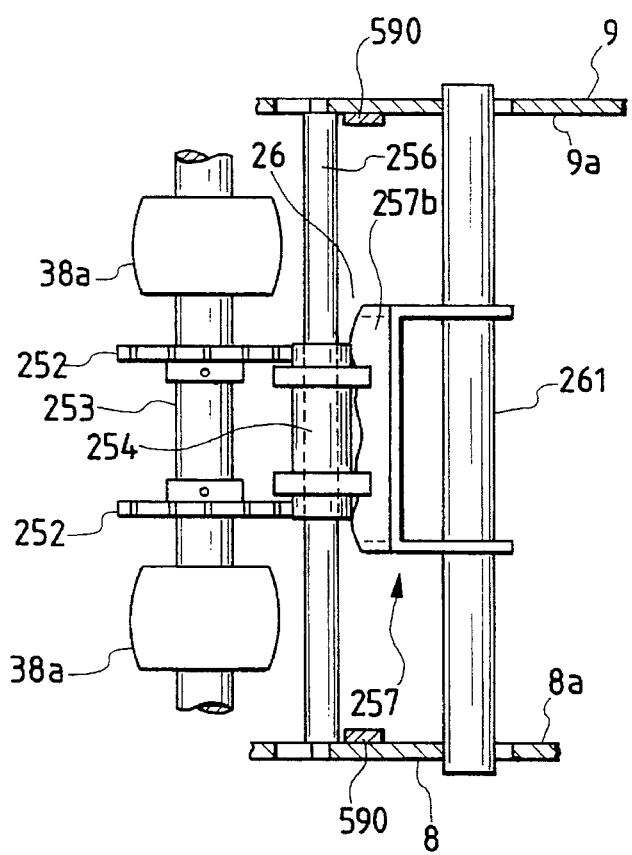
FIG. 15 is a plan view, partly broken, showing a modification of position of rollers in the fourth embodiment.

A stacking unit T is used for containing passes 1A each cut from an ATB pass 1 along the perforation 1b thereof in a stacked fashion. The stacking unit T, as shown in FIG. 12, is composed of a card table 257 receives a pass 1A discharged from the exit slit 4, the second transport belt unit 37 which includes the drive motor 33 as a card discharging means for discharging a pass 1A onto the card table 257, the second follower belt unit 38, the pad roller 47, the second flap 30, and a card hold roller 254 in contact with the card table 257. The stacking unit T further includes a blade wheel 252 and a stopper member 258. The blade wheel 252 as a rotary body is disposed closer to the rear end (when viewed in the card discharging direction of an arrow O) of the card table 257 as an auxiliary means of the stacking unit T. The stopper member 258, which includes a coiled spring 259, is disposed closer to the fore end 257c of the card table 257.

The card table 257, shaped like U in cross section, is disposed at a location closer to the rear end of the card discharge path 26, while being supported by shafts 261 and 262, which are supported by side plates 8A and 9A. The card table 257, together with the card hold roller 254, forms the exit slit 4. A flat contact surface 257b, facing the card discharge path 26, extends from the fore end 257c of the card table 257 over a distance of ⅓ of the entire length of the card table 257. A pawl 257A is located on the lower side of the flat contact surface 257b in a state that it is protruded above the flat contact surface 257b and into the card discharge path 26. A slanted face 257a is formed at the top end of the pawl 257A. The slanted face 257a guides a pass 1A transported from the card discharge path 26. Art upper side 257d of the pawl 257A is used for receiving the pass 1A discharged. A friction material 290 is bonded, by adhesive, to the contact surface 257b located close to the upper side 257d of the pawl 257A. The friction material 290 may be rubber, plate-like resin, felt, or the like.

The quantity of the passes 1A that can be contained in the card table 257 is substantially determined by a height t of the pawl 257A measured from the flat contact surface 257b and a spring force of a tension spring 260. In the present embodiment, approximately 20 sheets of passes 1A can be contained therein.

The stopper member 259 made of a coiled spring is disposed closer to the fore end 257c of the card table 257. One end of the stopper member 259 is coupled with a branch part 258a of a support member 258, which is slidably supported on the card table 257. The other end 259b of the stopper member 259 is extended in the direction orthogonal to the flat contact surface 257b. The transported pass 1A is hit against the stopper member 259 thus constructed.

The card hold roller 254 is rotatably supported by a support shaft 256, which is inserted in a pair of elongated holes 255 of the frames 8 and 9, and is located opposite to the contact surface 257b. The elongated holes 255 are extended to the flat contact surface 257b so that the support shaft 256 is slidable in the elongated holes 255.

A tension coiled spring 260, weak in spring force, is stretched between the support shaft 256 and a support pole 263 secured to the side walls 8A and 9A. The ends of the tension spring 260 are designated by reference numerals 260b and 260a. By the tension spring 260, the card hold roller 254 is lightly pressed against the flat contact surface 257b. A spring force of the tension spring 260 is selected to such a degree that when the pass 1A is put to between the card hold roller 254 and the flat contact surface 257b, the card hold roller 254 is easily detached from the flat contact surface 257b.

A body 252A of the blade wheel 252 is fastened to a support shaft 253 that supports the transport roller 38a. A plural number of blades 252B are radially extended from the body 252A, while being equidistantly arrayed around the body 252A. The blade wheel 252 is disposed at the center of the card discharge path 26 when viewed from top (FIG. 2). The blades 252B is made of flexible material, such as soft rubber. The blade wheel 252, which is disposed in the vicinity of the terminal 26a of the card discharge path 26, is arranged such that the blades 252B thereof are not brought into contact with the slanted face 257a of the pawl 257A, but are brought into slidable contact with the shaft part 254a of the card hold roller 254.

The operation of the stacking unit T thus constructed will be described. A pass 1A guided to the card discharge path 26 is transported from the path 26 to a location between the card table 257 and the card hold roller 254, by the second follower belt unit 38 and the pad roller 47, and held down by the card hold roller 254. A pass 1A, which first reaches the location between the card table 257 and the card hold roller 254, is put on the upper side 257d of the pawl 257A while being slid at its trailing edge thereon, and in contact with the flat contact surface 257b of the card table 257. Since the first pass 1A is in contact with the friction material 290 on the flat contact surface 257b, it is firmly positioned thereon. A pass 1A, which next arrives the location between the card table 257 and the card hold roller 254, is put on the first pass 1A while being held down by the card hold roller 254. In this way, the passes 1A are progressively stacked thereon. The subsequently stacked passes 1A are neatly arranged with respect to the first pass 1A because of frictional resistance by the surface to surface contact of the stacked passes 1A.

The operations of the blade wheel 252 and the stopper member 259, which are auxiliary means of the stacking unit T, will be described.

By the operation of the second follower belt unit 38, the blade wheel 252 fastened to the support shaft 253 is also turned in the same direction as the turn of the belt 38d. Accordingly, when the trailing edge 1Aa of the pass 1A enters a spatial area within which the blade wheel 252 turns, the blade 252B kicks up the trailing edge in the discharging direction. That is, the turning force of the blade wheel 252 serves as a pushing force to the pass 1A. Therefore, even if a transporting force by the belt 38d and the pad roller 47, or the nipping force by them, is lost, the pass 1A is reliably fed from the card discharge path 26 to the card table 257 by the turn of the blade wheel 252.

When the blade wheel 252 is turned in the transporting direction or counterclockwise, the card hold roller 254, which slidably contacts with the tip 252Ba of the blade, is turned clockwise, and it resists the advancement of the pass 1A passing between the card hold roller 254 and the flat contact surface 257b. As a result, the running speed of the pass 1A drops. The pass 1A advances along the flat contact surface 257b in the discharging direction, and hits against the end 259b of the stopper. Accordingly, the advancement of the pass 1A is stopped there, to thereby prevent the pass from running out of the card table 257. At this time, the card hold roller 254 is still turning clockwise. Then, the pass 1A that hit on the end of the stopper is moved to the upper side 257d of the pawl and placed thereon, by the card hold roller 254.

When the blade wheel 252 is turned in the card pull-in direction or clockwise, the card hold roller 254 is turned counterclockwise. Thus, the pass 1A placed on the upper side 257d is moved in the card discharging direction. Therefore, the pass 1A will never be pulled into the magnetic card reader.

The support shaft 256 is coupled with the elongated holes 255 extending to the flat contact surface 257b. It is lightly pressed against the flat contact surface 257b by the tension spring 260 of weak spring force. When the pass 1A advances to a location between the flat contact surface 257b and the card hold roller 254, the card hold roller 254 is easily moved to disengage from the flat contact surface 257b. Accordingly, even if a plural number of passes 1A are stacked between the card hold roller 254 and the flat contact surface 257b, the spring force to the card hold roller 254 is increased not excessively. As a result, the roller is easily displaced and a plural number of passes can be contained therein.

In the above-mentioned embodiment, the blades 252B of the blade wheel 252 are made of rubber. In an alternative shown in FIG. 14, a plural number of blades 252B' are radially extended from a body 252A', which is supported by the support shaft 253. The blades 252B' are made of films, which are more thinner than the blades 252B of rubber, and has a lower running resistance than the latter. Use of the blades 252B or the blades 252B' is determined by a transport speed of the pass 1A. When the transport speed of the pass 1A is high and a large running resistance is required for the pass 1A, the blade wheel 252 with the blades 252B which are thicker and has a large frictional resistance are used. When the transport speed is not so high, a blade wheel 252' with the blades 252B' which are thinner and has a small frictional resistance is used.

In the above-mentioned embodiment, a single blade wheel 252 is located at the central part of the card discharge path 26 when viewed from top. In an alternative shown in FIG. 15, a couple of blade wheels 252 of the same constructions are used. Also in this case, the blades 252B must slidably contact with the card hold roller 254. The blade wheels 252 may be substituted by the blade wheels 252', as a matter of course.

A modification of the stopper will be described. In the above-mentioned embodiment, the stopper 259 consists of a coiled spring, which is coupled with the support 258 slidably supported on the card table 257. Alternatively, friction members 590, which are brought into contact with a pass 1A to be discharged, may be provided on the inner surfaces 8a and 9a of the frames 8 and 9, which are located on both sides of the card table 257. The friction member may be a removable cloth band (called "magic tape") with the irregular surface, a plate-like resin, rubber material, or the like. Of those members, the removable cloth band is most preferable because the width of the card discharge path 26 is substantially equal to the card width and then there is a little clearance therebetween, and it is gentle against the pass 1A.

The friction members 590 thus provided resists against the advancement of the pass 1A that is transported from the card discharge path 26. Because of this, the friction members 590 decreases the transport speed of the pass 1A, so that it is put on the card table 257.

When the friction material 290 and the card hold roller 254 are used, the blade wheel 252 and the stopper 259 may be omitted.

As seen from the foregoing description, the thus constructed magnetic card readers of the present invention have the following useful effects.

Since the distance between the magnetic read/write means and the cutter unit is selected to be the sum of the length of the cut card which is the shortest of all of the cut cards when viewed in the transport direction and a braking distance of the transporting unit in a time from a constant transporting state of the transporting unit to a stop state of the transporting unit. Thus, the magnetic card being transported in a state that a portion of the magnetic card to be the shortest cut card is located on the trailing side, stops such that the cutting line of the magnetic card along which the magnetic card is cut or parted is positioned at the location where the cutter unit is placed. Therefore, the distance between the magnetic read/write means and the cutter unit is reduced to a minimum. This makes the magnetic card reader compact. Since the cutter unit is driven at the instant that the magnetic card is stopped, the cutting operation of the magnetic card is quickly performed, to thereby reduce a card processing time by the magnetic card reader.

Further, the magnetic card reader includes second path-selector means for guiding the magnetic card being transported in the reverse direction to a place other than the entrance port. The second path-selector means is located between the entrance port and the magnetic read/write means in the transport path. Thus, the magnetic card being transported in the reverse direction is not guided to the entrance port. Therefore, the transport path ranging from the entrance port to the magnetic read/write means may be reduced. This feature also makes the magnetic card reader compact.

Further, the second path-selector means guides the magnetic card to a retracting path including a printer therein. Therefore, necessary information may be printed on the magnetic card by the printer located in the retracting path.

Further, the magnetic card reader may include a stamper unit for stamping a mark on the cut card, which is located facing the transport path. In this case, a distance between the stamper unit and the cutter unit is shorter than the length of the shortest cut card. With the so selected distance, even when the magnetic card is transported in a state that a portion of the magnetic card to be the shortest cut card is located on the leading side, the cutter unit and the stacking unit may be concurrently operated. As a result, the card processing time is reduced.

Further, a distance between the cutter unit and the first path-selector means is longer than the length of the shortest cut card. Accordingly, if the shortest cut card is located between the cutter unit and the first path-selector means, there is no interference of the magnetic card with the first path-selector means. Thus, there is successfully eliminated the jamming caused by the interference of the magnetic card with the second path-selector means. The compacting of the magnetic card reader and the reduction of the card processing time are both secured.

Further, the magnetic card reader may include third path-selector means at the fore end of the collector path. In this case, a distance between the cutter unit in the transport path and the third path-selector means in the collector path is longer than the longest cut card which is the longest of all of the cut cards when viewed in the transport direction. Accordingly, even if the magnetic card is cut into the shortest cut card and the longest cut card in a state that the magnetic card is introduced into the collector path, there is no interference of the magnetic card with the third path-selector means. Thus, there is successfully eliminated the jamming caused by the interference of the magnetic card with the second path-selector means. The compacting of the magnetic card reader and the reduction of the card processing time are both secured.

Further, in the magnetic card reader, the collector path is extended toward the entrance port. With this feature, a length ratio of the collector path to the magnetic card reader is reduced, so that the entire length of the magnetic card reader is reduced, viz. the size reduction of the magnetic card reader is realized.

Further, the magnetic card reader may include first transporting means for transporting the magnetic card in the transport path connecting to the entrance port, the first transport means including a first drive belt unit driven by a first drive source and a first follower belt unit being in press contact with the first drive belt unit; second transport means for transporting the magnetic card in the card discharge path, the second transport means including a second drive belt unit driven by a second drive source and a second follower belt unit being in press contact with the second drive belt unit; and third transport means for transporting the magnetic card in the collector path, the third transport means including the second drive belt unit and a third follower belt Unit being in press contact with the second drive belt unit. In this construction, the first, second and third transporting means are individually operable. Accordingly, the magnetic card can efficiently be transported, the transport path, the card discharge path, and the collector path may be laid out more freely, and the card processing time is reduced.

In the just-mentioned magnetic card reader, the first and second drive belt units and the first, second and third follower belt units each include a belt and transport rollers, and a distance between the adjacent transport rollers is shorter than the length of the shortest cut card. The lengths of the transport path including the first transporting means, the card discharge path including the second transporting means, and the collector path including the third transporting means are selected to be the minimum length that is able to transport the shortest cut card. Therefore, the magnetic card reader is made compact.

In the magnetic card reader further including the first, second and third transporting means, a coefficient of friction of the transport surface of the drive belt of the first drive belt unit is different from that of the transport surface of the follower belt of the first follower belt unit. With the difference of the friction coefficients, it is possible to minimize the difference between a transport speed of a magnetic card being transported in the forward direction and that of the magnetic card being transported in the reverse direction. The transport speed difference arises from the fact that the transport path is curved. Therefore, the magnetic read/write means, even if it is located facing the curved transport path, can exactly read and write information out of and to the magnetic card.

More specifically, a coefficient of friction of the transport surface of the drive belt of the first drive belt unit is larger than that of the transport surface of the follower belt of the first follower belt unit.

Further, the present invention may be set forth as a magnetic card reader which receives a magnetic card with a magnetic stripe through an entrance port, transports the magnetic card along a transport path, carries out a process of reading and writing information out of and to the magnetic stripe of the magnetic card by a magnetic read/write means located facing the transport path, cuts the magnetic card into at least two cards in the direction orthogonal to the card transporting direction by a cutter unit located downstream of the magnetic read/write means in the transport path, and stamps a mark on the parted card by a stamper unit located downstream of the cutter unit, the magnetic card reader comprising: first path-selector means, located at the intersection of the card discharge path and the collector path, for guiding those cut cards to a card discharge path or a collector path, both being continuous to the transport path; second path-selector means for guiding the magnetic card being transported in the reverse direction to a place other than the entrance port, the second path-selector means being provided between the entrance port and the magnetic read/write means in the transport path; third path-selector means, located at the fore end of the collector path, for guiding the magnetic card that is introduced into the collector path into a collector box located at the fore end of the collector path; first transporting means for transporting the magnetic card in the transport path by a belt wound around a first group of transport rollers; second transporting means for transporting the magnetic card in the card discharge path by a belt wound around a second group of transport rollers; third transporting means for transporting the magnetic card in the collector path by a belt wound around a third group of transport rollers; a first drive source for driving the first transporting means; and a second drive source for driving the second and third transporting means; wherein a distance between the magnetic read/write means and the cutter unit is the sum of the length of the shortest cut card and a braking distance of the transporting unit in a time from a constant transporting state of the transporting unit to a stop state of the transporting unit by a stop signal derived from magnetic card detecting means provided before and after the magnetic read/write means, a distance between the cutting position of the cutter unit and the center of the stamping area of the stamper unit is shorter than the length of the shortest cut card, a distance between the cutter unit and the first path-selector means is longer than the length of the shortest cut card, a distance between the cutter unit in the transport path and the third path-selector means in the collector path is somewhat longer than the longest cut card which is the longest of all of the parted cards when viewed in the transport direction, and a distance between the adjacent transport rollers of the first, second and third groups of transport rollers is shorter than the length of the shortest cut card.

The magnetic card reader thus constructed have the following advantages and features.

1) The transport path between the entrance port and the magnetic read/write means, between the magnetic read/write means and the cutter unit, between the cutter unit and the stamper unit, and between the cutter unit and the first path-selector means are reduced in length.

2) A length ratio of the collector path to the magnetic card reader is reduced. Accordingly, the entire length of the magnetic card reader is also reduced.

3) The card processing time by the magnetic card reader is reduced, and the magnetic card reader is made compact since the cutter unit can be driven at the instant that the magnetic card is stopped, and the cutter unit and the stamper unit can be operated concurrently.

4) No jamming takes place in the transportation of the magnetic card. In other words, a smooth transportation of the magnetic card is secured. This advantage results from the following construction. In the construction, a distance between the cutter unit and the first path-selector means is longer than the length of the shortest cut card, and a distance between the cutter unit and the third path-selector means is longer than the longest cut card. Therefore, there is eliminated the interference of the magnetic card present in each transport path between them with the first and the second path-selector means.

5) The transport path, the card discharge path, and the collector path may be laid out more freely, the card processing time is reduced, the magnetic card can efficiently be transported, and the magnetic card reader can be made compact. Those advantages result from the following construction of the magnetic card reader. In the construction, a distance between the adjacent transport rollers in the first, second, and third transporting means is shorter than the length of the shortest cut card. The lengths of the transport path including the first transporting means, the card discharge path including the second transporting means, and the collector path including the third transporting means are selected to be the minimum length that is able to transport the shortest cut card. The first, second and third transporting means are individually operable.

Further, the magnetic card reader may include card discharging means for discharging the cut cards into the card discharge path; a card table, located at the fore end of the card discharge path, for receiving the magnetic card discharged by the card discharging means; and a card hold roller for pressing the magnetic cards against the card table. With this construction, a plural number of passes can reliably be held on the card table in a well arranged fashion.

The just mentioned magnetic card reader may include high frictional members attached to the surfaces of the card table which are to be in contact with the magnetic card. Use of the high frictional members simplifies the construction of the stacking unit.

What is claimed is:

1. A magnetic card reader which receives a magnetic card with a magnetic stripe, comprising:

an entrance port through which the magnetic card is inserted;

a first transporting means for transporting the magnetic card along a transport path;

magnetic read/write means for carriing out a process of reading and writing information out of and to the magnetic stripe of the magnetic card, the magnetic read/write means being located so as to face the transport path;

cutter unit for cutting the magnetic card into at least two cards in a direction orthogonal to a card transporting direction, the cutter unit being located in the transport path; and a card discharge path being continuous to the transport path;

a collector path being continuous to the transport path; and a first path-selector means located at an intersection of the card discharge path and the collector path and for guiding cut cards to the card discharge path or the collector path;

wherein a distance between the magnetic read/write means and the cutter unit is the sum of the length of the cut cards which is the shortest one of all the cut cards when viewed in the transport direction and a braking distance of the transporting means in a time from a constant transporting state of the transporting means to a stop state of the transporting means by a stop signal.

2. The magnetic card reader according to claim 1, further comprising a second path-selector means for guiding the magnetic card being transported in the reverse direction to a place other than the entrance port, said second path-selector means being provided between the entrance port and the magnetic read/write means in the transport path.

3. The magnetic card reader according to claim 2, wherein the second path-selector means guides the magnetic card to a retracting path, and the magnetic card reader further comprises a printer in the retracting path.

4. The magnetic card reader according to claim 1, further comprising a stamper unit located facing the transport path and for stamping a mark on the cut card, wherein a distance between the stamper unit and the cutter unit is shorter than the length of the shortest one of all the cut cards when viewed in the transport direction.

5. The magnetic card reader according to claim 1, wherein a distance between the cutter unit and the first path-selector means is longer than the length of the shortest one of all the cut cards when viewed in the transport direction.

6. The magnetic card reader according to claim 1, further comprising third path-selector means located at a front end of the collector path, wherein a distance between the cutter unit in the transport path and the third path-selector means in the collector path is longer than the cut card which is the longest of all the cut cards when viewed in the transport direction.

7. The magnetic card reader according to claim 1, wherein the collector path is extended toward the entrance port.

8. The magnetic card reader according to claim 6, wherein the collector path is extended toward the entrance port.

9. The magnetic card reader according to claim 1, further comprising second transport means for transporting the magnetic card in the card discharge path, and third transport means for transporting the magnetic card in the collector path;

wherein the first transport means includes a first drive belt unit driven by a first drive source and a first follower belt unit being in press contact with the first drive belt unit;

wherein the second transport means includes a second drive belt unit driven by a second drive source and a second follower belt unit being in press contact with the second drive belt unit; and wherein the third transport means includes the second drive belt unit and a third follower belt unit being in press contact with the second drive belt unit.

10. The magnetic card reader according to claim 9, wherein the first and second drive belt units and the first, second and third follower belt units each include a belt and transport rollers, and a distance between the adjacent transport rollers is shorter than the length of the shortest one of all the cut cards when viewed in the transport direction.

11. The magnetic card reader according to claim 9, wherein a coefficient of friction of a transport surface of the drive belt of the first drive belt unit is different from that of a transport surface of the follower belt of the first follower belt unit.

12. The magnetic card reader according to claim 11, wherein the coefficient of friction of the transport surface of the drive belt of the first drive belt unit is larger than that of the transport surface of the follower belt of the first follower belt unit.

13. A magnetic card reader which receives a magnetic card with a magnetic stripe through an entrance port, transports the magnetic card along a transport path, carries out a process of reading and writing information out of and to the magnetic stripe of the magnetic card by a magnetic read/write means located facing the transport path, cuts the magnetic card into at least two cards in the direction orthogonal to the card transporting direction by a cutter unit located downstream of the magnetic read/write means in the transport path, and stamps a mark on the cut card by a stamper unit located downstream of the cutter unit, the magnetic card reader comprising:

first path-selector means, located at an intersection of the card discharge path and the collector path, for guiding cut cards to a card discharge path or a collector path, both being continuous to the transport path;

second path-selector means for guiding the magnetic card being transported in the reverse direction to a place other than the entrance port, the first path-selector means being provided between the entrance port and the magnetic read/write means in the transport path;

third path-selector means, located at a front end of the collector path, for guiding the magnetic card that is introduced into the collector path into a collector box located at a front end of the collector path;

first transporting means for transporting the magnetic card in the transport path by a belt wound around a first group of transport rollers;

second transporting means for transporting the magnetic card in the card discharge path by a belt wound around a second group of transport rollers;

third transporting means for transporting the magnetic card in the collector path by a belt wound around a third group of transport rollers;

a first drive source for driving the first transporting means; and a second drive source for driving the second and third transporting means;

wherein a distance between the magnetic read/write means and the cutter unit is the sum of the length of the shortest cut card which is the shortest one of all the cut cards when viewed in the transport direction and a braking distance of the first transporting means in a time from a constant transporting state of the first transporting means to a stop state of the first transporting means by a stop signal derived from magnetic card detecting means provided before and after thed magnetic read/write means, a distance between the cutting position of the cutter unit and the center of a stamping area of the stamper unit is shorter than the length of the shortest cut card, a distance between the cutter unit and the first path-selector means is longer than the length of the shortest cut card, a distance between the cutter unit in the transport path and the third path-selector means in the collector path is somewhat longer than the longest cut card which is the longest of all the cut cards when viewed in the transport direction, and a distance between the adjacent transport rollers of the first, second and third groups of transport rollers is shorter than the length of the shortest cut card.

14. The magnetic card reader according to claim 1, further comprising:

card discharging means for discharging the cut cards in the card discharge path;

a card table, located at a front end of the card discharge path, for receiving the card discharged by the card discharging means; and a card hold roller for pressing the card against the card table.

15. The magnetic card reader according to claim 13, further comprising:

card discharging means for discharging the cut cards in the card discharge path;

a card table, located at a front end of the card discharge path, for receiving the card discharged by the card discharging means; and a card hold roller for pressing the card against the card table.

16. The magnetic card reader according to claim 14, further comprising a high frictional member attached to a surface of the card table which is to be in contact with the magnetic card.

17. The magnetic card reader according to claim 15, further comprising a high frictional member attached to a surface of the card table which is to be in contact with the magnetic card.

* * * * *